(12) United States Patent
Yoshidomi et al.

(10) Patent No.: US 9,281,729 B2
(45) Date of Patent: Mar. 8, 2016

(54) MOTOR UNIT

(71) Applicant: KABUSHIKI KAISHA YASKAWA DENKI, Kitakyushu-shi (JP)

(72) Inventors: Shiro Yoshidomi, Fukuoka (JP); Ikuma Murokita, Fukuoka (JP); Yuji Arinaga, Fukuoka (JP); Yasushi Yoshida, Fukuoka (JP); Jiro Muraoka, Fukuoka (JP); Shoji Oyama, Tokyo (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 305 days.

(21) Appl. No.: 14/016,227

(22) Filed: Sep. 3, 2013

(65) Prior Publication Data

US 2014/0062366 A1 Mar. 6, 2014

(30) Foreign Application Priority Data

Sep. 4, 2012 (JP) .................................. 2012-193707

(51) Int. Cl.
*H02K 29/08* (2006.01)
*H02K 11/00* (2006.01)
*G01D 5/14* (2006.01)

(52) U.S. Cl.
CPC ............ *H02K 11/0031* (2013.01); *G01D 5/145* (2013.01); *H02K 11/0026* (2013.01)

(58) Field of Classification Search
CPC ... G01D 5/145; G01D 11/245; G01D 5/2013; G01R 33/0047; G01R 33/07; G01P 3/487; G01P 1/026; G01B 7/046

USPC ............ 318/400.39, 400.38, 400.4, 603, 647, 318/652; 324/260, 261, 259, 173, 174, 179, 324/200, 207.11, 207.25
See application file for complete search history.

(56) References Cited

U.S. PATENT DOCUMENTS

| | | | | |
|---|---|---|---|---|
| 2,999,988 | A * | 9/1961 | Marie ................... | H01P 1/2138 333/1.1 |
| 5,124,625 | A * | 6/1992 | Wakabayashi ............ | H02P 8/32 318/400.2 |
| 6,614,223 | B2 * | 9/2003 | Schroeder .............. | G01D 5/145 324/207.21 |

(Continued)

FOREIGN PATENT DOCUMENTS

| | | |
|---|---|---|
| JP | 2000-161989 | 6/2000 |
| JP | 2001-194182 | 7/2001 |

*Primary Examiner* — Bentsu Ro
*Assistant Examiner* — Thai Dinh
(74) *Attorney, Agent, or Firm* — Mori & Ward, LLP

(57) ABSTRACT

A rotation detector provided in a motor unit according to an embodiment includes a first support and a second support, a pair of magnetic field generator, at least one magnetic field detector, and a first magnetic member and a second magnetic member. The pair of magnetic field generator is provided on the first support in a manner facing the second support, and has opposite polarities. The magnetic field detector is formed by winding a coil around a magnetic element whose magnetized direction changes in the longitudinal direction, and is provided on the second support in such a manner that a longitudinal-direction side of the magnetic element faces the first support. Each of the first magnetic member and the second magnetic member is made of a magnetic material, and covers a longitudinal-direction end of the magnetic field detector facing the first support.

14 Claims, 12 Drawing Sheets

(56) References Cited

U.S. PATENT DOCUMENTS

| | | | | |
|---|---|---|---|---|
| 6,774,599 B2 * | 8/2004 | Ishii | | G05B 19/02 |
| | | | | 318/652 |
| 7,049,776 B2 * | 5/2006 | Hornberger | | H02P 6/16 |
| | | | | 318/400.04 |
| 7,586,283 B2 * | 9/2009 | Kabashima | | G01D 5/145 |
| | | | | 318/602 |
| 7,936,145 B2 * | 5/2011 | Schmid | | G01K 7/36 |
| | | | | 318/471 |
| 8,466,646 B2 * | 6/2013 | O'Gorman | | H02P 6/18 |
| | | | | 318/400.32 |
| 8,575,876 B2 * | 11/2013 | Inoue | | G01D 5/3473 |
| | | | | 318/400.4 |
| 2012/0176070 A1 * | 7/2012 | Wallrafen | | G01D 3/0365 |
| | | | | 318/400.04 |

* cited by examiner

MOTOR UNIT

CROSS-REFERENCE TO RELATED APPLICATION

This application is based upon and claims the benefit of priority of the prior Japanese Patent Application No. 2012-193707, filed on Sep. 4, 2012, the entire contents of which are incorporated herein by reference.

FIELD

The embodiments discussed herein are directed to a motor unit.

BACKGROUND

Known is a motor unit provided with a rotation detector that detects a rotation of a shaft using magnetism. As such a rotation detector, a rotation detector using magnetism is known.

For example, the rotation detector (magnetic sensor for detecting rotations) illustrated in FIG. 7 in Japanese Patent Application Laid-open No. 2001-194182 (hereinafter, referred to as Document 1) includes a detector element that is a detection coil (11) wound around a wire-like magnetic element (10) in which a large Barkhausen jump can occur, and a drum-like base (20) whose rotational central axis (21) is connected to the target of detection, e.g., a motor shaft. In the drum-like base (20), a plurality of permanent magnets (31 to 36) of alternating polarities are arranged side by side at an equal interval. In this rotation detector, when the drum-like base (20) is rotated, the permanent magnets (31 to 36) sequentially pass a position near the wire-like magnetic element (10), whereby providing an alternating field to the wire-like magnetic element (10). As a result, the direction in which the wire-like magnetic element (10) is magnetized is switched sequentially, causing the detection coil (11) to output pulse signals indicating rotational conditions of the drum-like base (20).

In the rotation detector illustrated in FIG. 7 in Document 1, the wire-like magnetic element (10) extends in a direction parallel with the rotational axis of the drum-like base (20). Therefore, the size of the rotation detector in the direction along the rotational axis is large. Therefore, if such a rotation detector is mounted on a motor unit, the size of the motor unit is increased, disadvantageously.

By contrast, the rotation detector (rotation sensor) illustrated in FIG. 1 in Japanese Patent Application Laid-open No. 2000-161989 (hereinafter, referred to as Document 2) includes a sensor coil (2) formed by winding a coil wire (22) around a core metal (21) made of an amorphous magnetic material having a Barkhausen effect, and permanent magnets (1) that are attached to a rotational plate (200) rotating in a predetermined rotating direction. The axial direction of the core metal (21) in the sensor coil (2) is positioned in parallel with a direction tangential to the rotating direction of the rotational plate (200). Therefore, the rotation detector illustrated in FIG. 1 in Document 2 can reduce the size in the direction of the rotational axis, compared with the rotation detector illustrated in FIG. 7 in Document 1. Such a rotation detector can also be mounted on a motor unit so as to allow the size reduction of a motor unit to be achieved.

However, there are disadvantages such as those to be described below in a rotation detector in which the sensor coil (2) (magnetic field detector) is positioned so that the longitudinal direction of the core metal (21) (magnetic element) is laid in parallel with a direction tangential to the rotating direction of the rotational plate (200) on which the permanent magnets (1) are attached, as illustrated in FIG. 1 in Document 2.

For example, when an N-pole permanent magnet (1) and one end (2a) of the sensor coil (2) are brought near to each other as the rotational plate (200) is rotated, as illustrated in FIG. 2(a) in Document 2, because the magnetic field formed by the permanent magnet (1) passes through the core metal (21) in a direction from the one end (2a) toward the other end (2b) of the sensor coil (2), the core metal (21) is magnetized to one direction. When the N-pole permanent magnet (1) and the other end (2b) of the sensor coil (2) are brought near to each other as the rotational plate (200) is rotated, as illustrated in FIG. 2(b) in Document 2, because the magnetic field formed by the permanent magnet (1) passes through the core metal (21) in a direction from the other end (2b) toward the one end (2a) of the sensor coil (2), the core metal (21) is magnetized to the opposite direction of the one direction. A pulse signal corresponding to the direction in which of the core metal (21) is magnetized is output from the coil wire (22) included in the sensor coil (2).

The rotational conditions of the rotational plate (200) can be detected accurately if the magnetized direction of the core metal (21) changes only when the permanent magnet (1) and the one end (2a) of the sensor coil (2) are brought near to each other and when the permanent magnet (1) and the other end (2b) of the sensor coil (2) are brought near to each other as the rotational plate (200) is rotated. However, the magnetized direction of the core metal (21) could change in cases other than those described above.

To explain more, when a longitudinal-direction mid-portion of the permanent magnet (1) and a longitudinal-direction mid-portion of the sensor coil (2) are brought near to each other as the rotational plate (200) is rotated, the magnetized state of the core metal (21) could become unstable, and cause the magnetized direction of the core metal (21) to change. Such a change in the magnetized direction does not always occur when the longitudinal-direction mid-portion of the permanent magnet (1) and the mid-portion of the sensor coil (2) are brought near to each other, but sometimes occurs and sometimes not, and it is difficult to predict whether such a change in the magnetized direction will occur.

A possible cause of such a change in the magnetized direction of the core metal (21) that is difficult to predict is that the direction of the magnetic field applied by the permanent magnet (1) to the core metal (21) becomes different in a portion from the mid-portion toward the one end and in a portion from the mid-portion toward the other end of the core metal (21). When the direction of the magnetic field applied to the core metal (21) is different in the portion from the mid-portion toward the one end and in a portion from the mid-portion toward the other end of the core metal (21), the magnetized direction changes partially in the core metal (21), and the output level of a pulse signal output from the coil wire (22) becomes low. Furthermore, because application of the magnetic fields in different directions makes emergence of the large Barkhausen effect indeterminate, a variation occurs in the output level of the pulse signal. It is difficult for a detection circuit subsequently positioned to accurately detect a pulse signal varying at such a low level. As a result, a change in the magnetized direction in the core metal (21) cannot be detected accurately.

When such a change that is difficult to predict in the magnetized direction occurs, it becomes difficult to accurately detect the rotational conditions of the rotational plate (200). Therefore, it is difficult to detect the rotational conditions of the shaft of a motor unit provided with such a rotation detector and detects rotations of the shaft using the rotation detector.

SUMMARY

A motor unit according to an aspect of embodiments includes a motor configured to cause a shaft to be rotated about an axial line, and a rotation detector configured to detect a rotation of the shaft. The rotation detector includes a first support, a second support, a pair of magnetic field generator, at least one magnetic field detector, a first magnetic member, and a second magnetic member. The first support and the second support are provided in a manner separated from each other in a direction along the axial line, and one of which is rotated about the axial line as a rotational axis as the shaft is rotated. The pair of magnetic field generator is provided on the first support in a manner facing the second support at positions different from each other along a circumference around the axial line, and that has opposite polarities. The magnetic field detector is formed by winding a coil around a magnetic element whose magnetized direction changes in a longitudinal direction, and is provided on the second support in such a manner that a longitudinal-direction side of the magnetic element faces the first support. The first magnetic member and the second magnetic member are made of a magnetic material, cover longitudinal-direction both ends of the magnetic field detector facing the first support, respectively, and face each other with a space therebetween at a longitudinal-direction mid-portion of the magnetic field detector.

BRIEF DESCRIPTION OF DRAWINGS

A complete recognition of and advantages achieved by the present invention can be understood easily by reading the following description of embodiments with reference to the accompanying drawings.

DESCRIPTION OF EMBODIMENTS

Embodiments of the present invention will now be explained with reference to some drawings.

Motor System and Motor Unit

Figure 1:
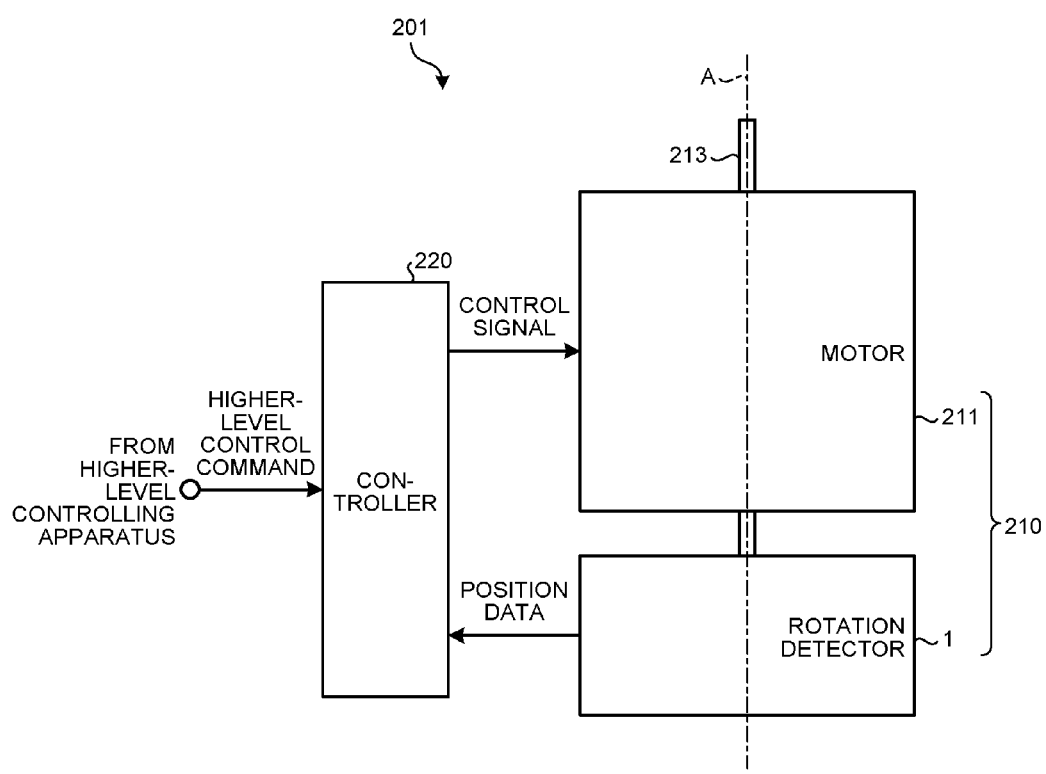
FIG. 1 is a schematic for explaining a motor system including a motor unit according to an embodiment.

FIG. 1 illustrates a motor system including a motor unit according to an embodiment. In FIG. 1, this motor system 201 includes a motor unit 210 and a controller 220. The motor unit 210 includes a motor 211 and a rotation detector 1.

The motor 211 includes a shaft 213. The motor 211 uses an axial line A as a rotational axis, and rotates the shaft 213 about the rotational axis, to output a rotative force. In the embodiment, the motor 211 is an electric motor that uses electricity as a power source, but the motor unit is not limited thereto, and may be a motor using any other power source, e.g., a hydraulic motor, a pneumatic motor, and a steam motor.

The rotation detector 1 is positioned on the opposite side of a load device receiving an output of the rotative force of the motor 211, and is connected to the shaft 213. The rotation detector 1 detects a rotational amount x of the motor 211 by detecting a rotational position (rotational angle) and a rotation count of the shaft 213, and outputs position data indicating the rotational amount x. The rotation detector 1 is also capable of detecting at least one of a rotation velocity v of the motor 211 and a rotation acceleration rate a of the motor 211, in addition to the rotational amount x of the motor 211, but explained in the embodiment is an example in which only the rotational amount x is detected.

The controller 220 receives a higher-level control command from a higher-level controlling apparatus not illustrated, and controls the motor 211 based on the higher-level control command. The controller 220 also receives the position data output from the rotation detector 1, and controls the rotation of the motor 211 based on the position data so that the rotation of the motor 211 is adjusted to the rotation that is based on the higher-level control command. In the embodiment in which an electric motor is used as the motor 211, the controller 220 controls the rotation of the motor 211 by controlling a current, a voltage, or the like to be applied to the motor 211 as a control signal, based on the position data. In a case in which the motor 211 is a hydraulic motor, a pneumatic motor, or a steam motor that uses another power source, the controller 220 can control the rotation of the motor 211 by controlling the supply of such a power source.

Figure 2:
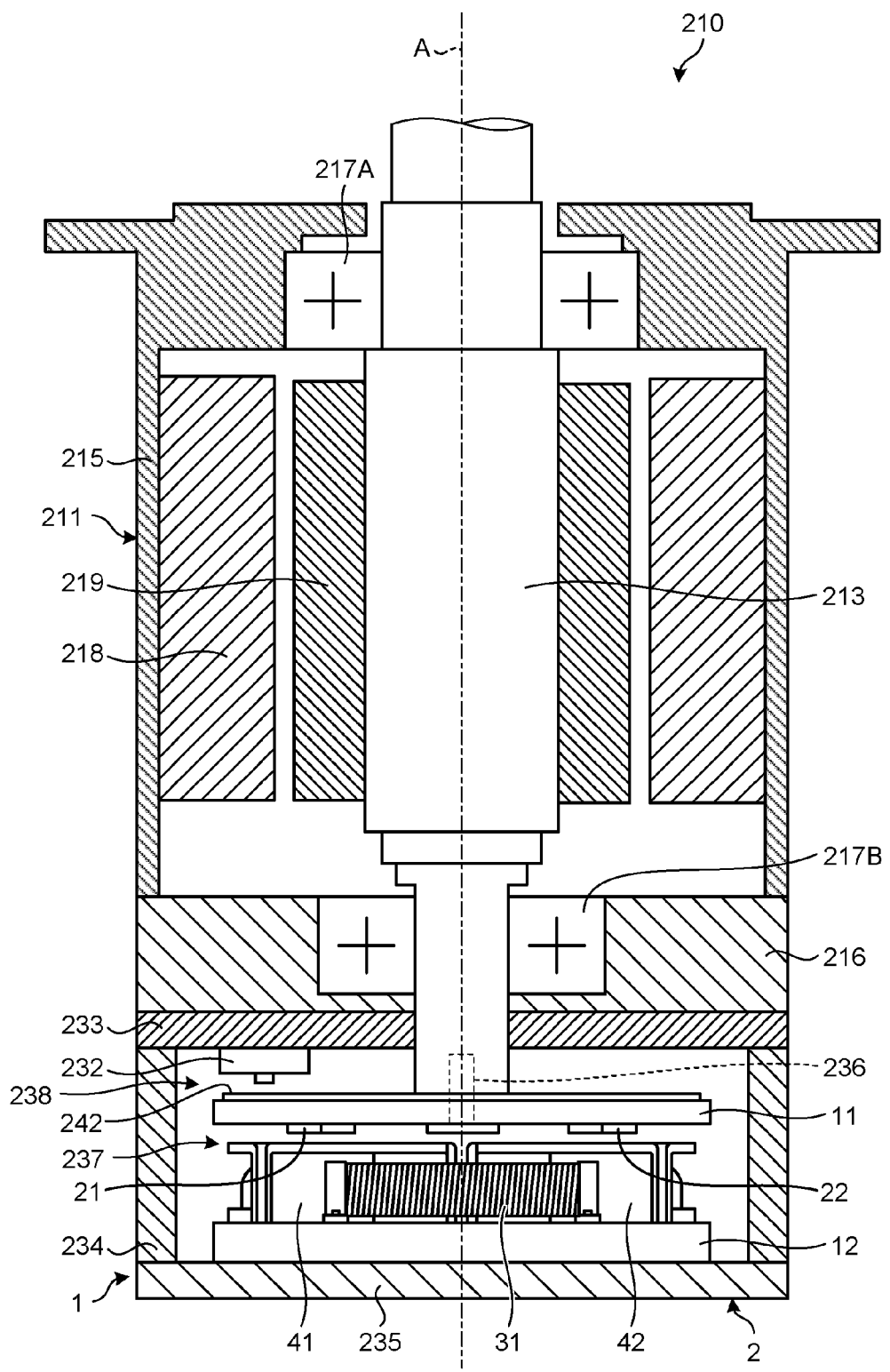
FIG. 2 is a schematic for explaining the motor unit according to the embodiment.

FIG. 2 illustrates a structure of the motor unit 210. As illustrated in FIG. 2, the motor unit 210 includes the motor 211 and the rotation detector 1, and the rotation detector 1 is mounted on the non-loaded side of the motor 211. The motor 211 includes the shaft 213, a frame 215, a bracket 216, bearings 217A and 217B, a stator 218, and a rotor 219.

The frame 215 has a tubular shape, and the outer circumference of the stator 218 is fixed to the inner circumferential surface of the frame 215. One end of the frame 215 supports the bearing 217A. The bracket 216 has an approximate disk shape. The outer circumferential of the bracket 216 is fixed to the other end of the frame 215. The inner circumferential portion of the bracket 216 supports the bearing 217B. These bearings 217A and 217B support the shaft 213 in a rotatable manner about the axial line A.

The stator 218 includes a stator core and a stator coil, and is fixed to the frame 215. The rotor 219 is positioned on the inner circumference side of the stator 218 via a space therebetween, in a manner facing the inner circumference surface of the stator 218. By allowing a current to flow through the stator coil of the stator 218, a rotating magnetic field is generated inside of the stator 218. The rotor 219 includes a rotor core and a plurality of permanent magnets. The rotor 219 is caused to be rotated by an interaction between the rotating magnetic field generated inside of the stator 218 and the magnetic field generated by the permanent magnets in the rotor 219. As the rotor 219 is rotated, the shaft 213 is caused to rotate about the axial line A.

Rotation Detector

Figure 3:
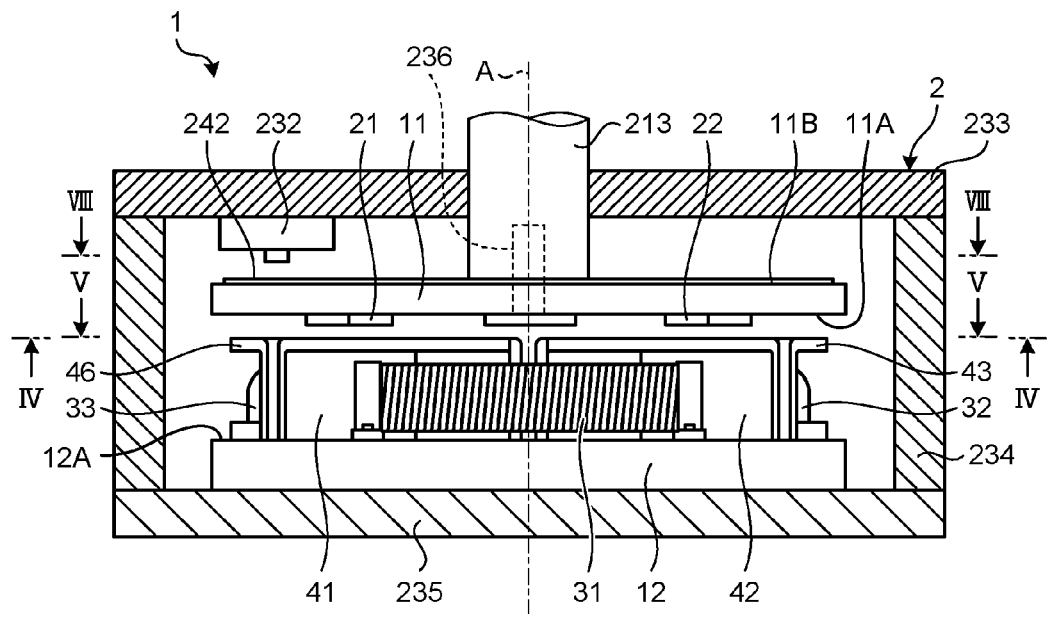
FIG. 3 is a schematic for explaining a rotation detector included in the motor unit according to the embodiment.

FIG. 3 illustrates the rotation detector 1. In FIG. 3, the rotation detector 1 is a device capable of detecting rotational conditions, e.g., the rotation count and the rotating direction, of the shaft 213.

A housing 2 of the rotation detector 1 includes a base portion 233, a back yoke 234, and a lid member 235. An opening through which the shaft 213 is passed is provided at the center of the base portion 233, and the load side of the shaft 213 is mounted on the bracket 216. The back yoke 234 is a cylindrical member made of a magnetic material such as a metal, and one end of the back yoke 234 is attached to a non-load side outer periphery of the base portion 233. The back yoke 234 improves the magnetic noise immunity of the rotation detector 1, so that malfunctioning of the rotation detector 1 caused by a leakage magnetic flux or the like from the motor 211 can be suppressed. The lid member 235 is mounted on the other end of the back yoke 234.

Housed in the housing 2, that is, in the space formed by the base portion 233, the back yoke 234, and the lid member 235 are a first support 11 and a second support 12. The housing 2 has a tubular shape with a lid, for example, and the first support 11 and the second support 12 both have a disk-like shape, for example. In the housing 2, the first support 11 and the second support 12 are positioned so that the axial line A passes through the centers of the first support 11 and of the second support 12. The first support 11 and the second support 12 are positioned separated from each other in a direction in which the axial line A extends, that is, along the axial line direction. A surface 11A of the first support 11 is perpendicular to the axial line A, and faces the second support 12. A surface 12A of the second support 12 is also perpendicular to the axial line A, and faces the first support 11. The first support 11 is capable of rotating about the axial line A as a rotational axis. By contrast, the second support 12 is fixed to the housing 2, and does not rotate. The shaft 213 is passed through the opening on the base portion 233 into the housing 2. An end of the shaft 213 is fixed to the first support 11 with a bolt 236, for example, in the housing 2. In this manner, the first support 11 is rotated in the housing 2 when the shaft 213 is rotated. The first support 11 is an example of means for rotating a magnetic field generated by means for generating a magnetic field, which will be described later, using the axial line A as a rotational axis, with respect to means for detecting a magnetic field and means for forming a magnetic path, both of which will be described later.

Figure 4:
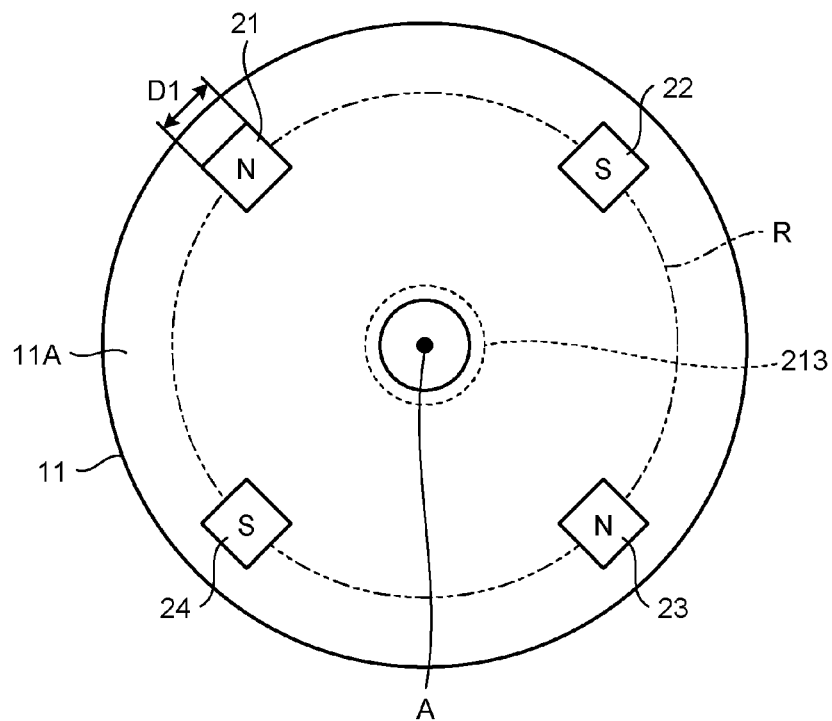
FIG. 4 is a schematic for explaining a first support and magnets provided to the rotation detector in the motor unit according to the embodiment, viewed from a direction of the arrow IV-IV in FIG. 3.

FIG. 4 is a schematic of the first support 11 and four magnets provided to the first support 11 included in the rotation detector 1, viewed from the direction across the arrow IV-IV in FIG. 3. As illustrated in FIG. 4, the first support 11 is provided with four magnets 21, 22, 23, and 24 each serving as a magnetic field generator. Each of the magnets 21, 22, 23, and 24 is a plate-line permanent magnet, for example. The magnets 21, 22, 23, and 24 are fixed to the surface 11A of the first support 11. On the surface 11A, the magnets 21, 22, 23, and 24 are arranged in an interspaced manner in the circumferential direction around the axial line A. The magnets 21, 22, 23, and 24 are arranged at an equal interval in the circumferential direction, for example. The magnets 21, 22, 23, and 24 are positioned at every 90 degrees, for example. The magnets 21, 22, 23, and 24 are arranged in a manner so as to have alternating polarities in the circumferential direction. For example, the magnets 21, 22, 23, and 24 are arranged so that the polarities of the magnets 21, 22, 23, and 24 on the side facing the second support 12 are the N-pole, the S-pole, the N-pole, and the S-pole, respectively. The magnets 21, 22, 23, and 24 generate a magnetic field in a space between the first support 11 and the second support 12. A long dashed doubleshort dashed line illustrated in FIG. 4 indicates a circumference intersecting with all of the four magnets 21, 22, 23, and 24, with a center at a point in the axial line A. When the first support 11 is rotated, the trajectory of the rotation of the magnets 21, 22, 23, and 24 follows the circumference R. As illustrated in FIG. 4, the size D1 of the magnet 21 in the circumferential direction (the size D1 of the magnet 21 in a direction along a line tangent to a point in the circumference R intersecting with the center of the magnet 21) is set to a predetermined size. In the same manner, the size of each of the magnets 22, 23, and 24 in the circumferential direction is set to the same size as that of the size D1 of the magnet 21. The magnets 21, 22, 23, and 24 are examples of the means for generating a magnetic field.

Figure 5:
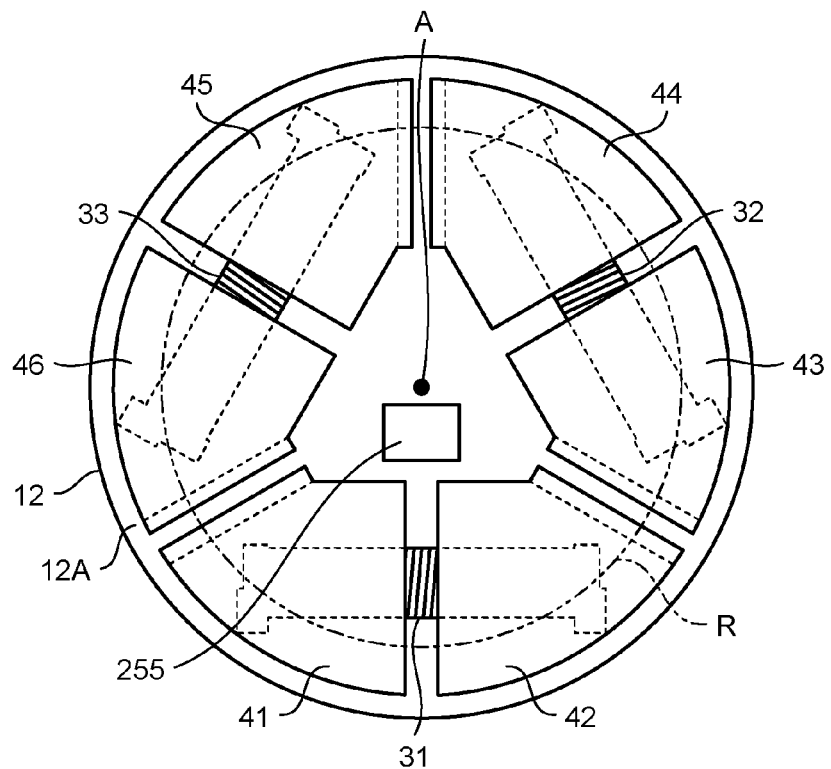
FIG. 5 is a schematic for explaining a second support, magnetic field detectors, and magnetic members provided to the rotation detector in the motor unit according to the embodiment, viewed from the direction of the arrow V-V in FIG. 3.
Figure 6:
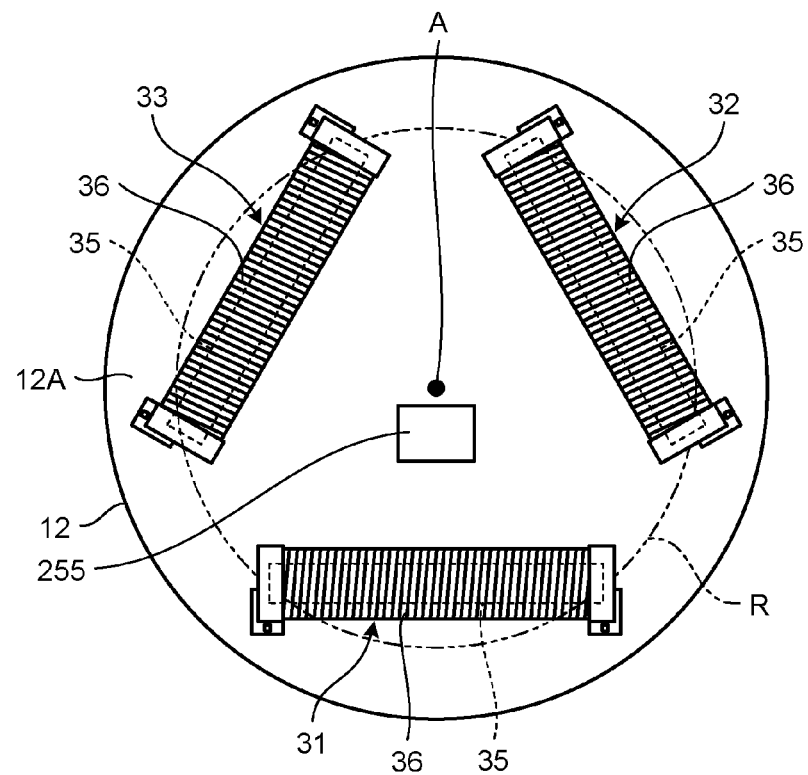
FIG. 6 is a schematic for explaining the structure illustrated in FIG. 5 when the magnetic members are removed.
Figure 7:
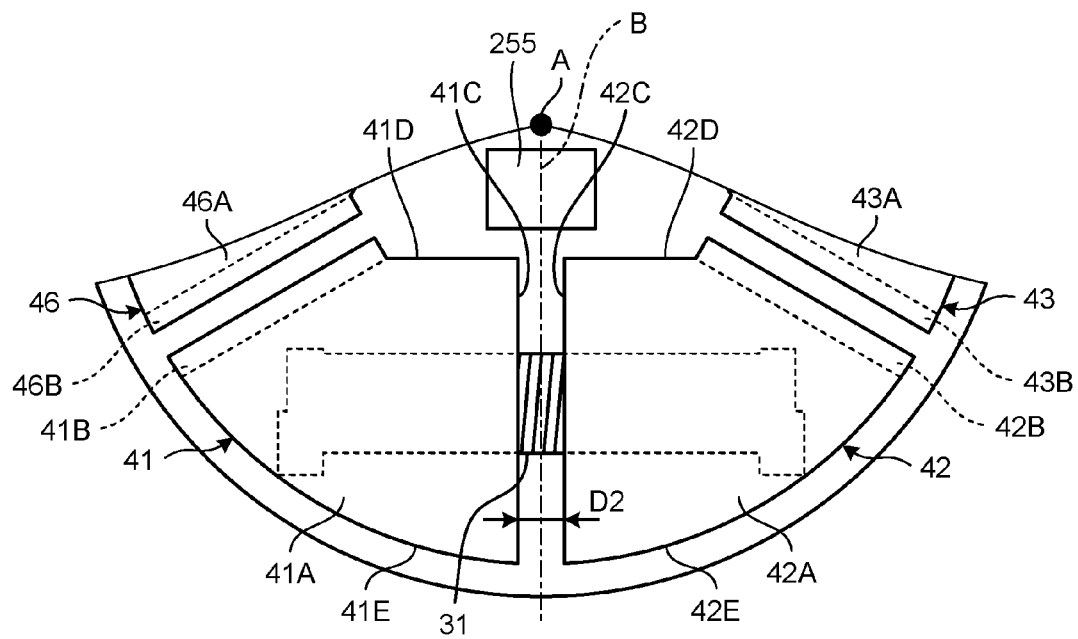
FIG. 7 is an enlarged view for explaining a part of the second support, the magnetic field detectors, and the like illustrated in FIG. 5.

FIG. 5 is a schematic of the second support 12, three magnetic field detectors provided to the second support 12, and magnetic members covering respective ends of each of the magnetic field detectors provided to the rotation detector 1, viewed from the direction of the arrow V-V in FIG. 3. FIG. 6 illustrates the structure illustrated in FIG. 5 with the magnetic members removed. FIG. 7 illustrates a part of the second support 12, one of the magnetic field detectors, and a pair of the magnetic members covering the magnetic field detector illustrated in FIG. 5, in an enlarged manner.

As illustrated in FIG. 6, the second support 12 is provided with the three magnetic field detectors 31, 32, and 33. Each of the magnetic field detectors 31, 32, and 33 is formed by winding a coil 36 around a wire-like, stick-like, or long-plate like magnetic element 35, which will be described later. The magnetic field detectors 31, 32, and 33 are fixed to the surface 12A of the second support 12. On the surface 12A, the magnetic field detectors 31, 32, and 33 are positioned in a manner interspaced from each other along the circumferential direction around the axial line A. The magnetic field detectors 31, 32, and 33 are arranged at an equal interval along the circumferential direction, for example. The magnetic field detectors 31, 32, and 33 are arranged at every 120 degrees, for example. The magnetic field detector 31 is positioned in such a manner that the longitudinal direction of the magnetic element 35 is in parallel with a tangent line to the circumference R (a tangent line being tangent to a point where the circumference R intersects with a line passing a point in the axial line A and a longitudinal-direction midpoint of the magnetic element 35). Similarly, each of the magnetic field detectors 32 and 33 are positioned so that the longitudinal direction of the magnetic element 35 is in parallel with the tangent line to the circumference R. Each of the magnetic field detectors 31, 32, and 33 is also positioned so that the one end and the other end of the corresponding magnetic element 35 overlaps with the circumference R. Each of the magnetic field detectors 31, 32, and 33 are also arranged so that the distance between one end of the corresponding magnetic element 35 and the axial line A becomes equal to the distance between the other end of the corresponding magnetic element 35 and the axial line A. Each of the magnetic field detectors 31, 32, and 33 detects the magnetic field generated by the magnets 21, 22, 23, and 24. Each of the magnetic field detectors 31, 32, and 33 is an example of the means for detecting a magnetic field.

In each of the magnetic field detectors 31, 32, and 33, a compound magnetic wire is used as the magnetic element 35. Generally, a compound magnetic wire is a thin, wire-like ferromagnetic material. A compound magnetic wire is a uniaxial and anisotropic compound magnetic material having a unique magnetic property in which the magnetized direction changes easily in the outer circumferential portion of the magnetic wire when a relatively small external magnetic field is applied, whereas the magnetized direction in the core portion does not change unless a relatively large external magnetic field is applied. If a compound magnetic wire is applied with a relatively large external magnetic field sufficient to reverse the magnetized direction in the core portion of the compound magnetic wire, in one direction parallel with the longitudinal direction of the compound magnetic wire, the magnetized direction in the core portion of the compound magnetic wire is aligned with the magnetized direction in the outer circumferential portion. If the compound magnetic wire is then applied with a relatively small external magnetic field at a level capable of reversing only the magnetized direction in the outer circumferential portion of the compound magnetic wire, in the other direction that is parallel with the longitudinal direction of the compound magnetic wire and is opposite to the one direction, only the magnetized direction in the outer circumferential portion is reversed, without causing any change in the magnetized direction in the core portion of the compound magnetic wire. As a result, the magnetized direction becomes different in the core portion and in the outer circumferential portion of the compound magnetic wire, and this state is maintained even after the external magnetic field is removed.

An external magnetic field is then applied, in the one direction, to the compound magnetic wire in which the core portion is magnetized in the one direction and the outer circumferential portion is magnetized to the other direction. At this time, the intensity of the external magnetic field is kept low in the beginning, and is gradually increased. At the point at which the intensity of the external magnetic field exceeds a certain level, a large Barkhausen effect occurs and the magnetized direction in the outer circumferential portion of the compound magnetic wire is suddenly reversed, from the other direction to the one direction. The electromotive force generated by the sudden reversal of the magnetized direction in the compound magnetic wire causes a pulse-like electric signal sharply rising toward a positive direction to be output from the coil wound around the compound magnetic wire, for example.

A compound magnetic wire in which both of the core portion and the outer circumferential portion are magnetized to the one direction is then applied with an external magnetic field in the other direction. At this time as well, the intensity of the external magnetic field is kept low in the beginning, and is gradually increased. When the intensity of the external magnetic field exceeds a certain level, the magnetized direction in the outer circumferential portion of the compound magnetic wire is suddenly reversed, from the one direction to the other direction. The electromotive force generated by the sudden reversal of the magnetized direction in the compound magnetic wire causes a pulse-like electric signal sharply rising toward a negative direction to be output from the coil wound around the compound magnetic wire, for example.

In each of the magnetic field detectors 31, 32, and 33 using such a compound magnetic wire as the magnetic element 35, when an external magnetic field is applied to the magnetic element 35, and the magnetized direction in the outer circumferential portion of the magnetic element 35 is changed, a pulse-like electric signal (hereinafter, referred to as a "detection pulse") is output from the coil 36 wound around the magnetic element 35. In the rotation detector 1, the external magnetic fields applied to the respective magnetic elements 35 correspond to the magnetic field generated by the magnet 21 and the magnet 22, the magnetic field generated by the magnet 22 and the magnet 23, the magnetic field generated by the magnet 23 and the magnet 24, and the magnetic field generated by the magnet 24 and the magnet 21. Focusing on one of these magnetic elements 35, when the first support 11 is rotated, these four magnetic fields are applied one after another to the magnetic element 35. These four magnetic fields are not large magnetic fields capable of changing the magnetized direction in the core portion as well as in the outer circumferential portion of the magnetic element 35, but are magnetic fields at a level only capable of changing the magnetized direction in the outer circumferential portion of the magnetic element 35. Based on the positional relation between the magnetic element 35 and the magnets 21, 22, 23, and 24, because the direction of the magnetic field changes every time the magnetic field applied to the magnetic element 35 is switched, the magnetized direction in the outer circumferential portion of the magnetic element 35 changes every time the magnetic field is switched. A detection pulse is output accordingly, from the coil 36 wound around the magnetic element 35.

In the rotation detector 1, the magnets 21, 22, 23, and 24 are arranged at an interval of 90 degrees, for example, whereas the magnetic field detectors 31, 32, and 33 are arranged at an interval of 120 degrees, for example. Therefore, as the first support 11 is rotated, the timing at which a detection pulse is output from the magnetic field detectors 31, 32, and 33 do not overlap each other. By performing a predetermined process using the detection pulse thus output from each of the magnetic field detectors 31, 32, and 33 at different timing, the rotation count and the rotating direction of the shaft 213 can be detected.

As illustrated in FIG. 5, the one end and the other end of the magnetic field detector 31 are covered by magnetic members 41 and 42, respectively. The one end and the other end of the magnetic field detector 32 are covered by magnetic members 43 and 44, respectively. The one end and the other end of the magnetic field detector 33 are covered by magnetic members 45 and 46, respectively. The magnetic members 41 and 42, the magnetic members 43 and 44, and the magnetic members 45, 46 are examples of the means for forming a magnetic path.

The magnetic members 41 and 42 will be explained specifically. As illustrated in FIG. 7, the magnetic members 41 and 42 are made of a magnetic material such as iron, for example, and are provided on the surface 12A of the second support 12 and fixed to the second support 12. The magnetic field detector 31 and the magnetic members 41 and 42 are not in contact with each other. The magnetic member 41 is not in contact with any one of the other magnetic members 42 to 46, and the magnetic member 42 is not in contact with any one of the other magnetic members 41, and 43 to 46.

The magnetic member 41 has a flat plate portion 41A and a side plate portion 41B. The flat plate portion 41A extends in parallel with the surface 11A of the first support 11 or the surface 12A of the second support 12, above one end of the magnetic field detector 31. The flat plate portion 41A covers one longitudinal-direction end of the magnetic field detector 31 facing the first support 11. The flat plate portion 41A extends toward the inner circumference side and the outer circumference side of the second support 12, from a position corresponding to the one longitudinal-direction end of the magnetic field detector 31, and covers a larger area toward the inner circumference side and the outer circumference side of the second support 12, than the one longitudinal-direction end of the magnetic field detector 31.

The side plate portion 41B is formed by bending one end of the flat plate portion 41A toward the second support 12. The side plate portion 41B covers an end surface of the one longitudinal-direction end of the magnetic field detector 31 (the left end surface in FIG. 7). The side plate portion 41B is perpendicular to the surface 12A of the second support 12 or to the flat plate portion 41A. The bottom end of the side plate portion 41B is fixed to the second support 12, so that the entire magnetic member 41 is fixed to the second support 12.

The magnetic member 42 has a line-symmetric shape to the magnetic member 41 with respect to a reference line B. The magnetic member 42 has a flat plate portion 42A and a side plate portion 42B, in the same manner as in the magnetic member 41. The flat plate portion 42A covers a part of the other longitudinal-direction end of the magnetic field detector 31 facing the first support 11. The flat plate portion 42A extends toward the inner circumference side and the outer circumference side of the second support 12, from a position corresponding to the other longitudinal-direction end of the magnetic field detector 31, and covers a larger area toward the inner circumference side and the outer circumference side of the second support 12, than the other longitudinal-direction end of the magnetic field detector 31. The side plate portion 42B covers an end surface of the other longitudinal-direction end of the magnetic field detector (the right end surface in FIG. 7). The bottom end of the side plate portion 42B is fixed to the second support 12, so that the entire magnetic member 42 is fixed to the second support 12.

The magnetic member 41 and the magnetic member 42 extend in directions toward the longitudinal-direction mid-portion of the magnetic field detector 3, in directions moving closer to each other. A facing end surface 41C of the magnetic member 41 and a facing end surface 42C of the magnetic member 42 face each other across a space therebetween, at a position corresponding to the longitudinal-direction mid-portion of the magnetic field detector 31. The facing end surfaces 41C and 42C extend in directions perpendicular to the axial line A and perpendicular to the longitudinal direction of the magnetic field detector 31. The facing end surfaces 41C and 42C extend from the inner circumference side of the second support 12, pass a position corresponding to the longitudinal-direction mid-portion of the magnetic field detector 31, and further toward the outer circumference side of the second support 12, while the distance between the facing end surfaces 41C and 42C are kept constant. The distance D2 between the facing end surface 41C and the facing end surface 42C are set to a given distance, as illustrated in FIG. 7. As will be described later, the size D1 of each of the magnets 21, 22, 23, and 24 in the circumferential direction and the distance D2 between the facing end surface 41C and the facing end surface 42C are set so that the size D1 is larger than the distance D2.

In the magnetic member 41, an inner circumference side end surface 41D facing the axial line A extends in a direction parallel with the longitudinal direction of the magnetic field detector 31. Similarly, in the magnetic member 42, an inner circumference side end surface 42D facing the axial line A extends in a direction parallel with the longitudinal direction of the magnetic field detector 31. An outer circumference side end surface 41E of the magnetic member 41 and an outer circumference side end surface 42E of the magnetic member 42 both extend in a shape of an arch, in a manner following the rim of the second support 12.

A major part of the magnetic field detector 31 facing the first support 11 is covered by the magnetic members 41 and 42, and only a small part is exposed to the first support 11, as illustrated in FIG. 7. In the area of the magnetic field detector 31 facing the first support 11, the area covered by the magnetic member 41 and the magnetic member 42 is larger than the area exposed.

The structures of the magnetic members 43 and 44, a positional relation between each of the magnetic members 43 and 44 and the magnetic field detector 32, and the like are the same as the structures of the magnetic members 41 and 42, the positional relation between each of the magnetic members 41 and 42 and the magnetic field detector 31, and the like. The structures of the magnetic members 45, 46, a positional relation between each of the magnetic members 45, 46 and the magnetic field detector 33, and the like are the same as the structures of the magnetic members 41 and 42, the positional relation between each of the magnetic members 41 and 42 and the magnetic field detector 31, and the like.

Among the magnetic members 41 to 46, adjacent pairs (41 and 42, 42 and 43, 43 and 44, 44 and 45, 45 and 46, and 46 and 41) in the circumferential direction are near to each other, as illustrated in FIG. 5, and a sequential arrangement of the magnetic members 41 to 46 formed by these pairs covers almost the entire circumference of the surface 12A of the second support 12 above the surface 12A, while the magnetic field detectors 31, 32, and 33 are interposed between these pairs and the second support 12. In other words, on a plane including the surface of each of the flat plate portions 41A to 46A of the respective magnetic members 41 to 46, the area of a section corresponding to a space between adjacent pairs of the magnetic members 41 to 46 is extremely smaller than the area of the surfaces of the flat plate portions 41A to 46A of the respective magnetic members 41 to 46. Such a sequential arrangement of the magnetic members 41 to 46 suppresses generation of a magnetic force between each of the magnets 21, 22, 23, and 24 and each of the magnetic field detectors 31, 32, and 33, and can even out the magnetic force in the circumferential direction. Therefore, generation of cogging when the first support 11 is rotated can be suppressed.

Figure 8:
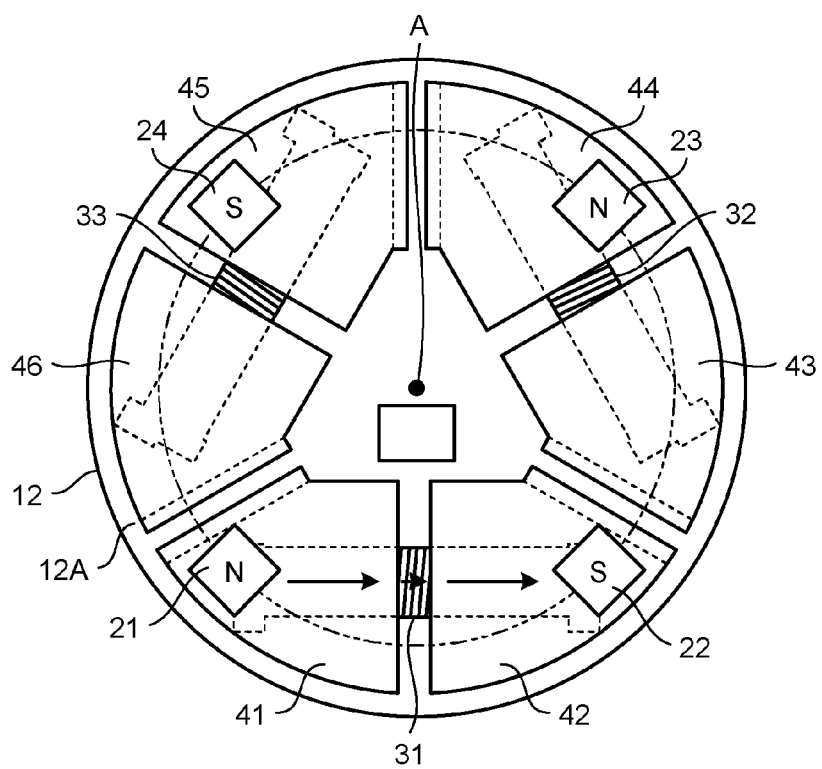
FIGS. 8, 10, and 12 are schematics for explaining an operation of the rotation detector in the motor unit according to the embodiment.
Figure 9:
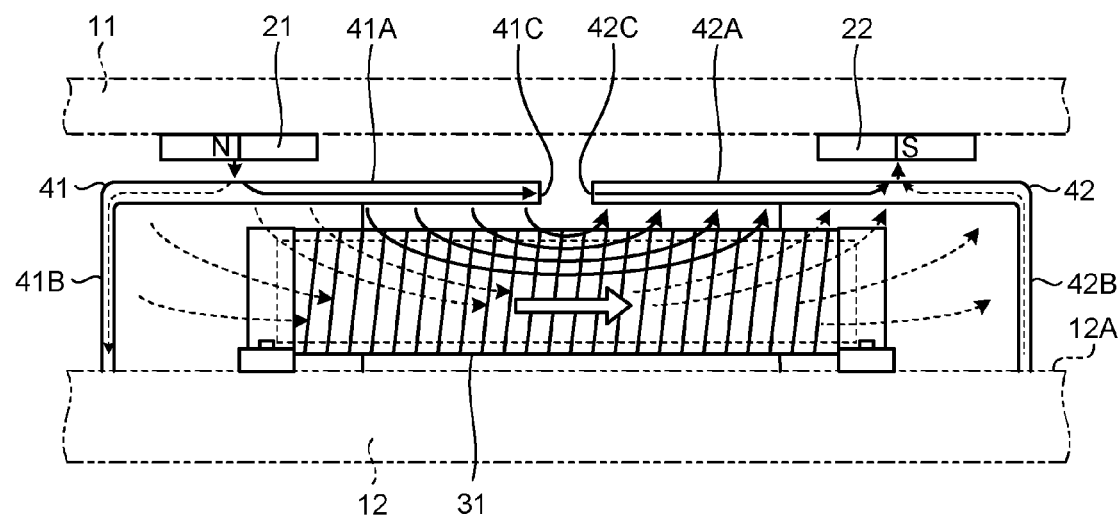
FIGS. 9 and 11 are schematics for explaining the paths of the magnetic field in the rotation detector provided to the motor unit according to the embodiment.
Figure 10:
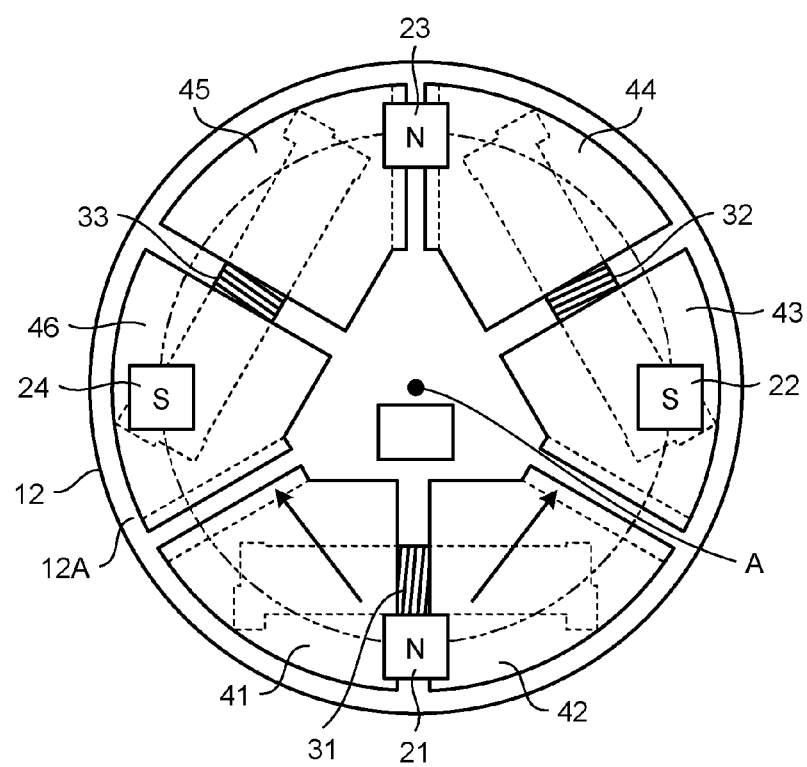
Figure 11:
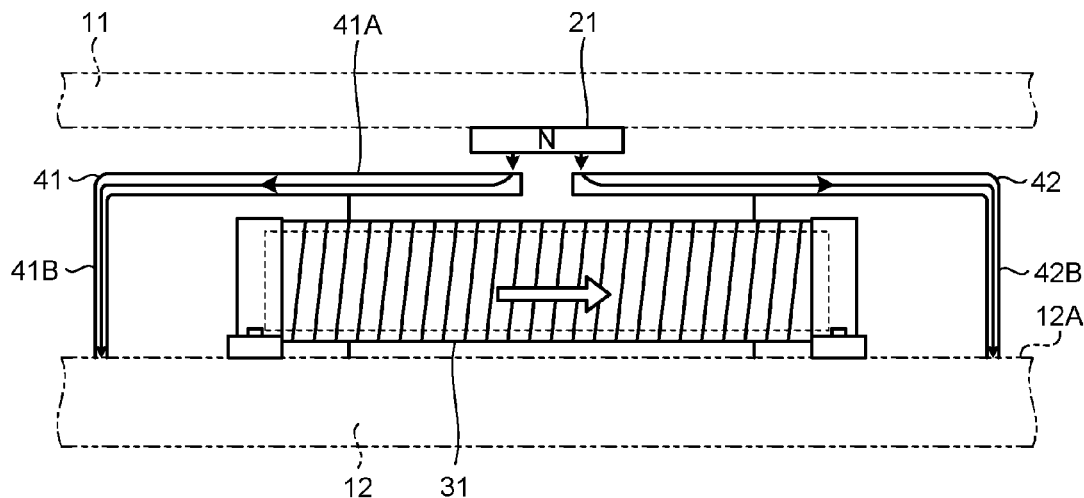
Figure 12:
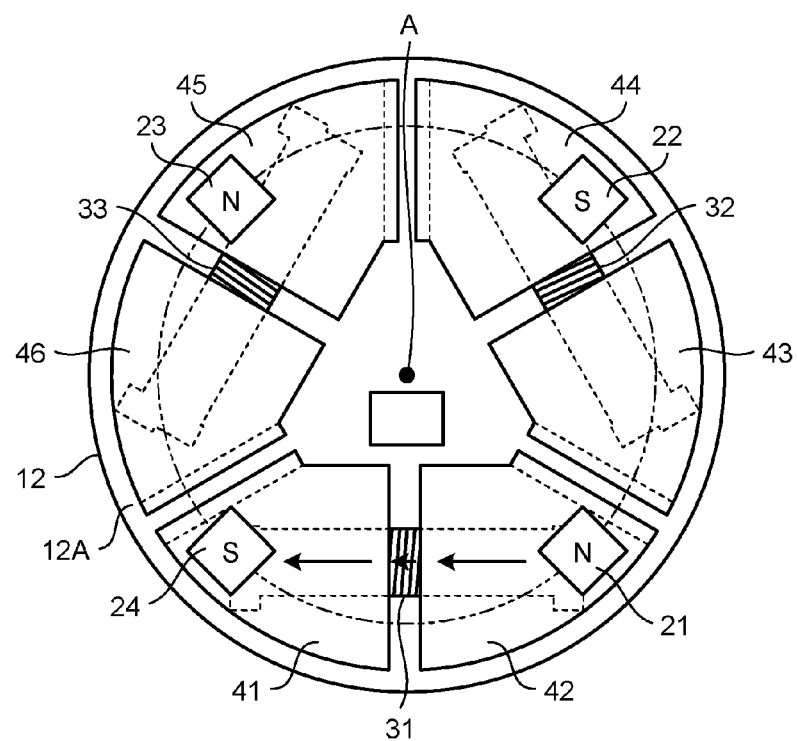

FIGS. 8 to 12 illustrate the operation of the rotation detector 1. Among these drawings, FIGS. 8, 10, and 12 illustrate the rotation detector 1 viewed from the direction of the arrow VIII-VIII in FIG. 3, but the housing 2, the shaft 213, and the first support 11 are not illustrated for the convenience of explanations.

To begin with, a basic operation of the rotation detector 1 will be explained with reference to FIGS. 8 and 12. As the shaft 213 is rotated, the magnets 21, 22, 23, and 24 are rotated with the first support 11 in a clockwise direction or a counter clockwise direction, and the magnetic field generated between the first support 11 and the second support 12 by the magnets 21, 22, 23, and 24 is rotated as well. Because the magnetic field detectors 31, 32, and 33 remain unmoved while the magnetic field is thus rotated, the polarity of the magnetic field applied to the magnetic field detectors 31, 32, and 33 changes as the magnetic field is rotated. In this manner, in each of the magnetic field detectors 31, 32, and 33, the magnetized direction in the outer circumferential portion of the magnetic element 35 is changed, and a detection pulse is output from the coil 36. Based on the detection pulse, the rotation count and the rotating direction of the shaft 213 can be detected.

This operation will now be explained specifically, by focusing on the magnetic field detector 31. For example, it is assumed that the first support 11 is rotated in the counter clockwise direction when the magnetic element 35 in the magnetic field detector 31 is magnetized in a direction toward one end from the other end. As the rotation causes the N-pole magnet 21 to move near the one end of the magnetic field detector 31, and the S-pole magnet 22 to move near the other end of the magnetic field detector 31, as illustrated in FIG. 8, the magnetic field traveling in a direction from the magnet 21 toward the magnet 22 causes the magnetized direction in the outer circumferential portion of the magnetic element 35 in the magnetic field detector 31 to be reversed. As a result, the magnetized direction of the magnetic element 35 is changed to a direction toward the other end from the one end. Such a reversal in the magnetized direction of the magnetic element 35 results in a detection pulse sharply rising toward the positive direction, for example, to be output from the coil 36 wound around the magnetic element 35.

As the first support 11 is continuously rotated in the counter clockwise direction, causing the S-pole magnet 24 to move near one end of the magnetic field detector 31 and the N-pole magnet 21 to move near the other end of the magnetic field detector 31, as illustrated in FIG. 12, the magnetic field traveling in a direction from the magnet 21 toward the magnet 24 causes the magnetized direction in the outer circumferential portion of the magnetic element 35 in the magnetic field detector 31 to be reversed. As a result, the magnetized direction of the magnetic element 35 is changed to a direction from the other end toward one end. Such a reversal in the magnetized direction of the magnetic element 35 results in a detection pulse sharply rising in the negative direction, for example, to be output from the coil 36 wound around the magnetic element 35.

As the first support 11 is continuously rotated, causing the N-pole magnet 23 to move near the one end of the magnetic field detector 31 and the S-pole magnet 24 to move near the other end of the magnetic field detector 31, a magnetic field traveling in a direction from the magnet 23 toward the magnet 24 changes the magnetized direction of the magnetic element 35 in the magnetic field detector 31 from the one end toward the other end, and a detection pulse sharply rising in the positive direction, for example, is output from the coil 36. As the first support 11 is continuously further rotated, causing the S-pole magnet 22 to move near one end of the magnetic field detector 31 and the N-pole magnet 23 to move near the other end of the magnetic field detector 31, the magnetic field traveling in a direction from the magnet 23 toward the magnet 22 causes the magnetized direction of the magnetic element 35 in the magnetic field detector 31 to change in a direction from the other end toward the one end, and a detection pulse sharply rising in the negative direction, for example, is output from the coil 36. The magnetic field detectors 32 and 33 operate in the same manner as the magnetic field detector 31.

A magnetic field guiding function achieved by the magnetic members 41 to 46 will now be explained with reference to FIGS. 8 to 12. The magnetic members 41 and 42 have a function for guiding a magnetic field to be applied to the magnetic field detector 31 by the magnets 21, 22, 23, and 24, whereby forming a given magnetic path. The magnetic members 43 and 44 have a function for guiding a magnetic field applied to the magnetic field detector 32 by the magnets 21, 22, 23, and 24, whereby forming a given magnetic path. The magnetic members 45 and 46 have a function for guiding a magnetic field to be applied to the magnetic field detector 33 by the magnets 21, 22, 23, and 24, whereby forming a given magnetic path.

The magnetic field guiding function achieved by the magnetic members 41 and 42 for the magnetic field detector 31 will be explained specifically. It is assumed herein that, for example, the first support 11 is rotated in the counter clockwise direction, causing the N-pole magnet 21 to move near one end of the magnetic field detector 31, and the S-pole magnet 22 to move near the other end of the magnetic field detector 31, as illustrated in FIG. 8. At this time, because the magnetic member 41 is interposed between the magnet 21 and the one end of the magnetic field detector 31, and the magnetic member 42 is interposed between the magnet 22 and the other end of the magnetic field detector 31, as illustrated in FIG. 9, a large portion of the magnetic fluxes traveling from the magnet 21 toward the magnet 22 enters the magnetic member 41, not the one end of the magnetic field detector 31, from magnet 21. The magnetic fluxes entering the magnetic member 41 travel through the flat plate portion 41A of the magnetic member 41 toward the magnetic member 42. Because the magnetic member 41 and the magnetic member 42 are separated from each other in the longitudinal-direction mid-portion of the magnetic field detector 31, the magnetic fluxes traveled through the flat plate portion 41A of the magnetic member 41 approach the magnetic member 42, but does not enter the magnetic member 42 directly. Instead, the magnetic fluxes enter a part of the mid-portion slightly near the one end of the magnetic field detector 31. The magnetic fluxes entering the part of the mid-portion slightly near one end of the magnetic field detector 31 pass through the magnetic field detector 31 toward the other end of the magnetic field detector 31, pass through the longitudinal-direction midpoint of the magnetic field detector 31, and reach a part of the mid-portion slightly near the other end of the magnetic field detector 31. The magnetic fluxes reaching the part of the mid-portion slightly near the other end of the magnetic field detector 31 become separated from the magnetic field detector 31, and enters the magnetic member 42.

The magnetic fluxes entering the magnetic member 42 travel through the flat plate portion 42A of the magnetic member 42 toward the magnet 22, and reach the magnet 22 via the magnetic member 42.

In the manner described above, when the magnet 21 moves near one end of the magnetic field detector 31, and the magnet 22 moves near the other end of the magnetic field detector 31, a magnetic field traveling in a direction from the magnet 21 toward the magnet 22 is guided by the magnetic members 41 and 42, and a magnetic path indicated by arrows in a black solid line in FIG. 9 is formed. As a result, because a large portion of the magnetic field is applied to the mid-portion of the magnetic field detector 31, the magnetic flux density in the mid-portion of the magnetic field detector 31 becomes higher than those in the one end or the other end of the magnetic field detector 31.

Furthermore, large portions of the one end and the other end of the magnetic field detector 31 facing the first support 11 are covered by the flat plate portions 41A and 42A of the magnetic members 41 and 42, respectively, and the one end surface (left end surface) and the other end surface (right end surface) of the magnetic field detector 31 are covered by the side plate portions 41B and 42B of the magnetic members 41 and 42, respectively. Therefore, when the N-pole magnet 21 moves near the one end of the magnetic field detector 31 and the S-pole magnet 22 moves near the other end of the magnetic field detector 31, a magnetic field traveling in a direction from the one end toward the other end of the magnetic field detector 31 is generated in the internal space covered by the magnetic member 41 and the magnetic member 42 around the magnetic field detector 31, as indicated by arrows in a black dashed line in FIG. 9. The magnetic field is applied to the one end and the other end, as well as to the mid-portion, of the magnetic element 35. Because a large portion of the magnetic fluxes traveling from the magnet 21 toward the magnet 22 travels through the magnetic path indicated by the arrows in the black solid line in FIG. 9, the intensity of the magnetic field indicated by the arrows in the black dashed line in FIG. 9 is lower than that of the magnetic field indicated by the arrows in the black solid line in FIG. 9. Therefore, when the magnetic field indicated by the arrows in the black dashed line in FIG. 9 is applied to the magnetic field detector 31, the magnetic flux density in the entire magnetic field detector 31 is increased, while the magnetic flux density in the mid-portion of the magnetic field detector 31 is kept higher than that in the one end or in the other end of the magnetic field detector 31.

By applying such a magnetic field to the magnetic field detector 31, the outer circumferential portion of the magnetic element 35 in the magnetic field detector 31 is magnetized in a direction indicated by a white arrow in FIG. 9, that is, in a direction from the one end toward the other end of the magnetic element 35. Therefore, when the magnetized direction in the outer circumferential portion of the magnetic element 35 is in a direction from the other end toward the one end of the magnetic element 35, the magnetized direction in the outer circumferential portion of the magnetic element 35 is reversed, and a detection pulse sharply rising in the positive direction, for example, is output from the coil 36 wound around the magnetic element 35.

When the first support 11 is then further rotated by 45 degrees in the counter clockwise direction, causing the N-pole magnet 21 to move near the mid-portion of the magnetic field detector 31, as illustrated in FIG. 10, because the distance between the magnet 21 and the magnetic member 41 is shorter than the distance between the magnet 21 and the magnetic field detector 31, as illustrated in FIG. 11, a large portion of the magnetic fluxes traveling from the magnet 21 toward the magnet 24 enters the magnetic member 41, not the mid-portion of the magnetic field detector 31, from the magnet 21. The magnetic fluxes entering the magnetic member 41 pass through the magnetic member 41 toward the magnet 24. In this manner, entry of the magnetic fluxes into the magnetic field detector 31 can be suppressed. Furthermore, because the magnetic member 41 and the magnetic member 46 are separated from each other with a space therebetween, as illustrated in FIG. 10, a large portion of the magnetic fluxes traveling through the magnetic member 41 does not enter the magnetic member 46.

Furthermore, when the magnet 21 moves near the mid-portion of the magnetic field detector 31, because the distance between the magnet 21 and the magnetic member 42 is shorter than the distance between the magnet 21 and the magnetic field detector 31, as illustrated in FIG. 11, a large portion of the magnetic fluxes traveling from the magnet 21 toward the magnet 22 enters the magnetic member 42, not the mid-portion of the magnetic field detector 31, from the magnet 21. The magnetic fluxes entering the magnetic member 42 travel through the magnetic member 42 toward the magnet 22. In this manner, entry of the magnetic fluxes into the magnetic field detector 31 can be suppressed. Furthermore, because the magnetic member 42 and the magnetic member 43 are separated from each other with a space therebetween, as illustrated in FIG. 10, a large portion of the magnetic fluxes traveling through the magnetic member 42 do not enter the magnetic member 43.

Because the size D1 of the magnet 21 in the circumferential direction (see FIG. 4) is set larger than the distance D2 between the facing end surface 41C on the magnetic member 41 and the facing end surface 42C on the magnetic member 42 (see FIG. 7), when the magnet 21 moves near the mid-portion of the magnetic field detector 31, the distance between the magnet 21 and the magnetic member 41 and the distance between the magnet 21 and the magnetic member 42 are reliably kept shorter than the distance between the magnet 21 and the magnetic field detector 31. Therefore, when the magnet 21 moves near the mid-portion of the magnetic field detector 31, a large portion of the magnetic fluxes traveling from the magnet 21 toward the magnet 24 and toward the magnet 22 is reliably allowed to enter the magnetic members 41 and 42, and entry of the magnetic fluxes into the magnetic field detector 31 can be suppressed or prevented effectively.

Furthermore, large areas of the one end and the other end of the magnetic field detector 31 facing the first support 11 are covered by the flat plate portion 41A of the magnetic member 41 and by the flat plate portion 42A of the magnetic member 42, respectively. The end surface of the one end (left end surface) and the end surface of the other end (right end surface) of the magnetic field detector 31 are also covered by the side plate portion 41B of the magnetic member 41 and the side plate portion 42B of the magnetic member 42, respectively. Therefore, when the magnet 21 moves near the mid-portion of the magnetic field detector 31, the effect of suppressing the entry of the magnetic fluxes traveling from the magnet 21 toward the magnet 24 and toward the magnet 22 into the magnetic field detector 31 can be improved.

When the magnet 21 comes to be positioned right at the middle between the magnetic member 41 and the magnetic member 42, the magnetic fluxes traveling through the magnetic member 41 and the magnetic fluxes traveling through the magnetic member 42 come to be symmetrically positioned, as illustrated in FIG. 11. Therefore, in the internal space covered by the magnetic member 41 and the magnetic member 42 around the magnetic field detector 31, the magnetic field traveling from the magnet 21 toward the magnet 22 and the magnetic field traveling from the magnet 21 toward the magnet 24 cancel out each other, and the magnetic fields become almost zero.

In the manner described above, when the magnet 21 is near the mid-portion of the magnetic field detector 31, the magnetic field traveling from the magnet 21 toward the magnet 24 and the magnetic field traveling from the magnet 21 toward the magnet 22 are guided by the magnetic member 41 and the magnetic member 42, respectively, in such a manner that the magnetic field detector 31 is avoided. As a result, a large portion of the magnetic fluxes in the magnetic field is not allowed to enter the magnetic field detector 31. Therefore, the magnetized direction in the outer circumferential portion of the magnetic element 35 in the magnetic field detector 31 is not changed. The direction indicated by the white arrow in FIG. 11 remains the same as the direction indicated by the white arrow in FIG. 9, and these arrows suggest that the magnetized direction of the magnetic element 35 is not changed. Therefore, no detection pulse is output from the coil 36 wound around the magnetic element 35.

As the first support 11 is further rotated by 45 degrees in the counter clockwise direction, as illustrated in FIG. 12, causing the S-pole magnet 24 to move near the one end of the magnetic field detector 31 and the N-pole magnet 21 to move near the other end of the magnetic field detector 31, the magnetic field traveling in a direction from the magnet 21 toward the magnet 24 is guided by the magnetic members 41 and 42, and follows the same path as that of the magnetic field indicated by the arrows in the black solid line and the arrows in the black dashed line in FIG. 9, except in the opposite direction. In other words, a large portion of the magnetic fluxes traveling from the magnet 21 toward the magnet 24 travels from the magnet 21 through the magnetic member 42, the mid-portion of the magnetic field detector 31, and the magnetic member 41 in a sequential manner, and reaches the magnet 21. As a result, because a large portion of the magnetic field traveling in a direction from the magnet 21 toward the magnet 24 is applied to the mid-portion of the magnetic field detector 31, the magnetic flux density in the mid-portion of the magnetic field detector 31 becomes higher than those in the one end and in the other end of the magnetic field detector 31. In addition, a relatively less intense magnetic field, traveling in a direction from the other end toward the one end of the magnetic field detector 31, is generated in the internal space covered by the magnetic member 41 and the magnetic member 42 around the magnetic field detector 31. As a result, the magnetic flux density in the entire magnetic field detector 31 is increased while the magnetic flux density in the mid-portion of the magnetic field detector 31 is kept higher than those in the one end and in the other end of the magnetic field detector 31.

Because such a magnetic field is applied to the magnetic field detector 31, the outer circumferential portion of the magnetic element 35 in the magnetic field detector 31 is magnetized in a direction from the other end toward the one end of the magnetic element 35. Therefore, when the magnetized direction in the outer circumferential portion of the magnetic element 35 is in a direction from the one end toward the other end of the magnetic element 35, the magnetized direction in the outer circumferential portion of the magnetic element 35 is reversed, and a detection pulse sharply rising in the negative direction, for example, is output from the coil 36 wound around the magnetic element 35

In the manner described above, with the magnetic field guiding function provided to the magnetic members 41 and 42, when the magnets of opposite polarities move near the one end and the other end of the magnetic field detector 31, respectively, the magnetic field can be guided so that the magnetic fluxes generated by these magnets pass through the mid-portion of the magnetic field detector 31, rather than the one end and the other end of the magnetic field detector 31. Furthermore, when a magnet moves near the mid-portion of the magnetic field detector 31, entry of the magnetic fluxes generated by the magnet into the magnetic field detector 31 can be suppressed.

In this manner, when a pair of magnets having opposite polarities move near the one end and the other end of the magnetic field detector 31, respectively, the magnetic flux density in the mid-portion of the magnetic element 35 in the magnetic field detector 31 can be mainly increased. By contrast, when a magnet moves near the mid-portion of the magnetic field detector 31, the magnetic flux density in the entire magnetic element 35 in the magnetic field detector 31 can be reduced. Therefore, only when the magnets of opposite polarities move near the one end and the other end of the magnetic field detector 31, respectively, the magnetic flux density in the magnetic element 35 in the magnetic field detector 31 can be increased. Hence, only when the magnets of opposite polarities move near the one end and the other end of the magnetic field detector 31, respectively, the magnetized direction of the magnetic element 35 can be changed. In other words, it is possible to prevent the magnetized direction of the magnetic element 35 in the magnetic field detector 31 from being changed while the magnets of opposite polarities are not near the one end and the other end of the magnetic field detector 31, respectively.

Figure 13:
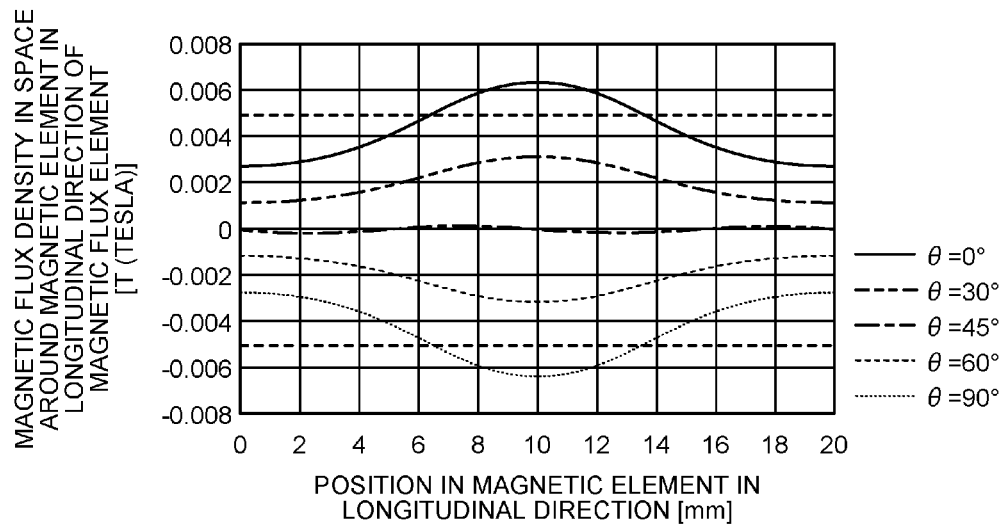
FIG. 13 is a graph of characterization lines indicating a relation between a longitudinal position in one of the magnetic elements and a magnetic flux density in the magnetic element, in the rotation detector included in the motor unit according to the embodiment.

FIG. 13 illustrates a relation between a longitudinal position in the magnetic element 35 in the magnetic field detector 31 and a magnetic flux density in the magnetic element 35, when the first support 11 is rotated from 0 degrees to 90 degrees in the counter clockwise direction. In FIG. 13, a position at 0 millimeters in the longitudinal direction of the magnetic element 35 corresponds to the position of the one end of the magnetic element 35. A position at 10 millimeters in the longitudinal direction of the magnetic element 35 corresponds to the midpoint of the magnetic element 35, and a position at 20 millimeters in the longitudinal direction of the magnetic element 35 corresponds to the position of the other end of the magnetic element 35. $\theta$ denotes a rotational angle of the first support 11 in the counter clockwise direction. For example, when the magnet 21 and the magnet 22 are near the one end and the other end of the magnetic field detector 31, respectively (see FIG. 8), the rotational angle of the first support 11 is 0 degrees ($\theta=0$ degrees). In this example, when the rotational angle of the first support 11 reaches 45 degrees ($\theta=45$ degrees), the magnet 21 is brought near the mid-portion of the magnetic field detector 31 (see FIG. 10). When the rotational angle of the first support 11 reaches 90 degrees ($\theta=90$ degrees), the magnet 24 and the magnet 21 are brought near the one end and the other end of the magnetic field detector 31, respectively (see FIG. 12).

When the rotational angle of the first support 11 is 0 degrees, the magnetic flux density in the mid-portion of the magnetic element 35 reaches its maximum in the positive direction, as indicated by the solid characterization line in FIG. 13. This means that, when the magnet 21 and the magnet 22 are near the one end and the other end of the magnetic field detector 31, respectively, the magnetic field in a direction from the magnet 21 toward the magnet 22 is guided by the magnetic members 41 and 42, and a large portion of the magnetic fluxes is caused to pass through the mid-portion of the magnetic field detector 31. When the rotational angle of the first support 11 is 0 degrees, the magnetic flux densities in the one end and the other end of the magnetic element 35 are increased in the positive direction, as indicated by the solid characterization line in FIG. 13, compared with when the rotational angle of the first support 11 is not 0 degrees. This means that, when the magnet 21 and the magnet 22 are near the one end and the other end of the magnetic field detector 31, respectively, a magnetic field in a direction from the one end toward the other end of the magnetic field detector 31 is generated in the internal space covered by the magnetic member 41 and the magnetic member 42 around the magnetic field detector 31, and such a magnetic field is applied to the magnetic element 35.

While the rotational angle of the first support 11 changes from 0 degrees toward 45 degrees, the magnetic flux density in the magnetic element 35 changes toward zero, as indicated by the long dashed double-short dashed characterization line in FIG. 13. This means that, as the magnet 21 and the magnet 22 move away from the one end and the other end of the magnetic field detector 31, respectively, the degree by which the magnetic fluxes in a direction from the magnet 21 toward the magnet 22 pass through the mid-portion of the magnetic field detector 31 becomes reduced. At the same time, this means that the intensity of the magnetic field in a direction from the one end toward the other end of the magnetic field detector 31 formed in the internal space covered by the magnetic member 41 and the magnetic member 42 around the magnetic field detector 31 becomes reduced.

When the rotational angle of the first support 11 reaches 45 degrees, the magnetic flux density in every point in the longitudinal direction of the magnetic element 35 becomes almost zero, as indicated by the long dashed short dashed characterization line in FIG. 13. This means that, as the magnet 21 moves near the mid-portion of the magnetic field detector 31, the magnetic fluxes in the direction from the magnet 21 toward the magnet 22 and the magnetic fluxes in the direction from the magnet 21 toward the magnet 24 are both guided by the magnetic members 41 and 42 in such a manner that the magnetic field detector 31 is avoided, and, as a result, these magnetic fluxes are not allowed to enter the mid-portion of the magnetic field detector 31. This also means that, because the magnetic members 41 and 42 cover large areas of the one end and the other end of the magnetic field detector 31, the effect of suppressing entry of the magnetic field into the magnetic field detector 31 is increased.

As the rotational angle of the first support 11 changes from 45 degrees toward 90 degrees, the magnetic flux density in the mid-portion of the magnetic element 35 is increased in the negative direction, as indicated by the dashed characterization line in FIG. 13. This means that, as the magnet 24 and the magnet 21 move near the one end and the other end of the magnetic field detector 31, respectively, a degree by which the magnetic fluxes in the direction from the magnet 21 toward the magnet 24 pass through the mid-portion of the magnetic field detector 31 is increased. This also means that the intensity of the magnetic field in the direction from the other end toward the one end of the magnetic field detector 31 generated in the internal space covered by the magnetic member 41 and the magnetic member 42 around the magnetic field detector 31 is gradually increased.

The magnetic flux density in the mid-portion of the magnetic element 35 reaches its maximum in the negative direction when the rotational angle of the first support 11 is 90 degrees, as indicated by the dotted characterization line in FIG. 13. This means that, when the magnet 24 and the magnet 21 move near the one end and the other end of the magnetic field detector 31, respectively, the magnetic field in the direction from the magnet 21 toward the magnet 24 is guided by the magnetic members 41 and 42, and a large portion of the magnetic fluxes passes through the mid-portion of the magnetic field detector 31. When rotational angle of the first support 11 is 0 degrees, the magnetic flux densities in the one end and the other end of the magnetic element 35 is increased in the negative direction, as indicated by the dotted characterization line in FIG. 13, compared with when the rotational angle of the first support 11 is not 0 degrees. This means that, when the magnet 24 and the magnet 21 move near the one end and the other end of the magnetic field detector 31, respectively, the magnetic field in a direction from the other end toward the one end of the magnetic field detector 31 is generated in the internal space covered by the magnetic member 41 and the magnetic member 42 around the magnetic field detector 31, and such a magnetic field is applied to the magnetic element 35.

When the magnetic flux density in the magnetic element 35 changes as the first support 11 is rotated, as illustrated in FIG. 13, the characteristics of the magnetic element 35 are set so that the magnetized direction in the outer circumferential portion becomes reversed when the magnetic flux density exceeds about 0.005 Tesla in the positive direction, and when the magnetic flux density exceeds −0.005 Tesla in the negative direction, for example. Achieved in this manner is a rotation detector 1 in which a reversal of the magnetized direction in the magnetic element 35 is ensured and a detection pulse at a sufficient output level is output from the coil 36 when the rotational angle of the first support 11 is 0 degrees and 90 degrees, while a detection pulse is reliably prevented being output from the coil 36 when the rotational angle of the first support 11 is 45 degrees because the magnetized direction of the magnetic element 35 are never reversed. In other words, achieved in this manner is a rotation detector 1 enabled to prevent a change that is difficult to predict in the magnetized direction of the magnetic element 35, and to detect the rotational conditions of the first support 11 (the shaft 213) highly accurately.

In FIG. 13, the range of the change in the magnetic flux density in the magnetic element 35 is within a range from −0.008 Tesla to 0.008 Tesla, but the range of the change in the magnetic flux density in the magnetic element 35 becomes different depending on the magnetic characteristics and the like of the magnets 21, 22, 23, and 24, the respective magnetic elements 35, and the like.

Figure 14:
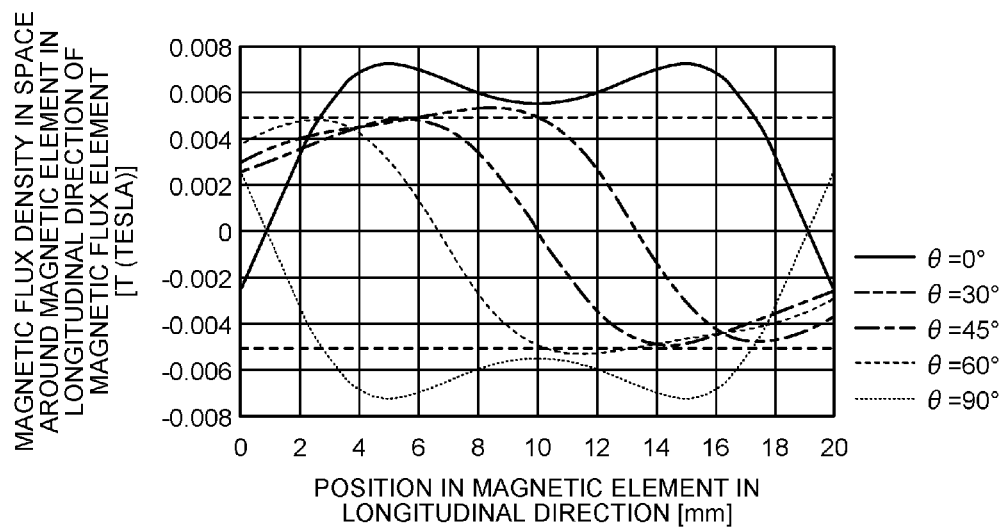
FIG. 14 is a graph of characterization lines indicating a relation between a longitudinal position in one of the magnetic elements and a magnetic flux density in the magnetic element in a rotation detector according to a comparative example.

FIG. 14 illustrates a result of examination of a relation between a position in the longitudinal direction of the magnetic element 35 in the magnetic field detector 31 and a magnetic flux density in the magnetic element 35 while the first support 11 rotated from 0 degrees to 90 degrees in the counter clockwise direction, using a rotation detector that is the rotation detector 1 without the magnetic members 41 to 46, as a comparative example. In the rotation detector according to this comparative example, the magnetic field detector 31 is not covered by the magnetic members 41 and 42, so that magnetic field is not guided by the magnetic members 41 and 42 in the manner described above. In this case, when the rotational angle of the first support 11 reaches 45 degrees and the magnet 21 moves near the mid-portion of the magnetic field detector 31, the magnetic flux density at a position near 5 millimeters in the longitudinal direction of the magnetic element 35 was 0.005 Tesla, and the magnetic flux density at a position near 15 millimeters in the longitudinal direction was −0.005 Tesla, as indicated by a long dashed short dashed characterization line in FIG. 14. In this manner, without the magnetic members, when the magnet moves near the mid-portion of the magnetic field detector, the magnetic flux density in one end of the magnetic element is prominently increased in the positive (negative) direction, and the magnetic flux density in the other end of the magnetic element is prominently increased in the negative (positive) direction. Therefore, when the magnet moves near the mid-portion of the magnetic field detector, the magnetized direction of the magnetic element could be reversed, and it is also difficult to predict if such a reversal will occur. As a result, a detection pulse could be output at an unexpected timing, and therefore, it is difficult to detect the rotational conditions of the first support 11 (the shaft 213) highly accurately.

By contrast, in the rotation detector 1 provided with the magnetic members 41 to 46, the magnetic flux density is almost zero in every position across the longitudinal direction of the magnetic element 35 when the rotational angle of the first support 11 is 45 degrees, as illustrated in FIG. 13. In this manner, from the comparison between FIG. 13 and FIG. 14 focusing on the magnetic flux density in the magnetic element 35 when the rotational angle of the first support 11 is 45 degrees, it can be understood that the detection accuracy of the rotational conditions of the first support 11 (the shaft 213) can be improved by providing the magnetic members 41 to 46.

Figure 15:
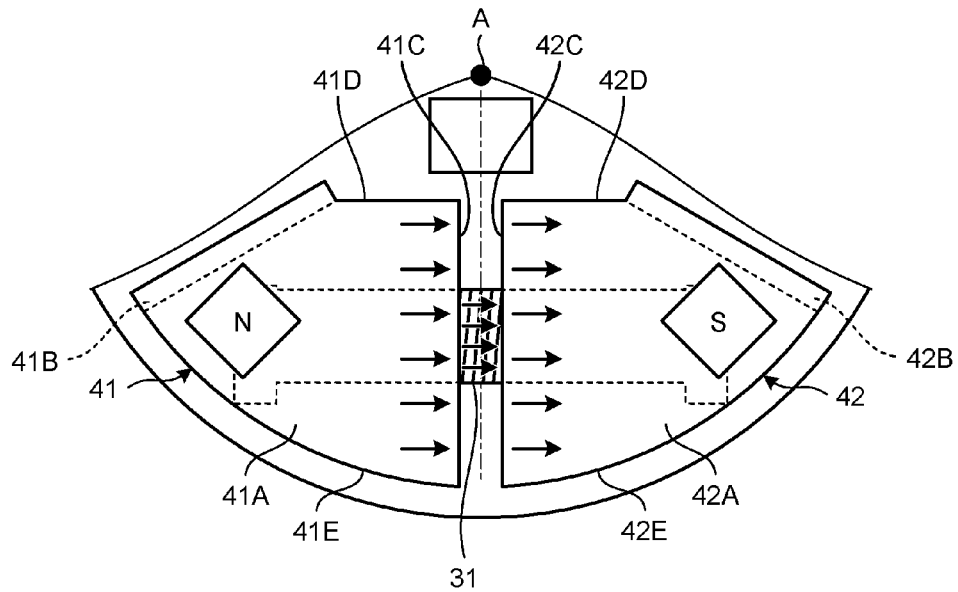
FIG. 15 is a schematic for explaining magnetic field traveling through the magnetic members and the like in the rotation detector included in the motor unit according to the embodiment.

The magnetic members 41 and 42 are also provided with some structural characteristics for improving the performance of the magnetic field guiding function. These structural characteristics will now be explained with reference to FIG. 15. The arrows in FIG. 15 schematically illustrate the magnetic field generated in the magnetic members 41 and 42 when the magnet 21 and the magnet 22 move near the one end and the other end of the magnetic field detector 31, respectively.

The inner circumference side end surface 41D of the magnetic member 41 facing the axial line A and the inner circumference side end surface 42D of the magnetic member 42 facing the axial line A both extend in a direction parallel with the longitudinal direction of the magnetic field detector 31. Therefore, when the magnet 21 and the magnet 22 move near the one end and the other end of the magnetic field detector 31, respectively, the magnetic fluxes traveling through the magnetic member 41 and the magnetic fluxes traveling through the magnetic member 42 travel in a direction almost in parallel with the longitudinal direction of the magnetic field detector 31. In this manner, scattering of the magnetic fluxes traveling through the magnetic member 41 or the magnetic fluxes traveling through the magnetic member 42 in directions moving away from the magnetic field detector 31 can be suppressed while traveling. In particular, scattering of the magnetic fluxes traveling through the magnetic member 41 from the inner circumference side end surface 41D toward the outside of the magnetic member 41 can be suppressed, and scattering of the magnetic fluxes traveling through the magnetic member 42 from the inner circumference side end surface 42D to the outside of the magnetic member 42 can be suppressed. Therefore, when the magnet 21 and the magnet 22 move near the one end and the other end of the magnetic field detector 31, respectively, the magnetic members 41 and 42 can improve the effect of guiding the magnetic field in a direction from the magnet 21 toward the magnet 22 to the magnetic field detector 31, and the magnetic field detector 31 can be kept in a stable condition while the magnetic flux density is kept high.

The facing end surface 41C of the magnetic member 41 and the facing end surface 42C of the magnetic member 42 both extend in a direction perpendicular to the axial line A and perpendicular to the longitudinal direction of the magnetic field detector 31. Therefore, when the magnet 21 and the magnet 22 move near the one end and the other end of the magnetic field detector 31, respectively, the magnetic fluxes traveling through the magnetic member 41 and the magnetic fluxes traveling through the magnetic member 42 travel in a direction almost in parallel with the longitudinal direction of the magnetic field detector 31. In this manner, scattering of the magnetic fluxes traveling through the magnetic member 41 or the magnetic fluxes traveling through the magnetic member 42 in directions moving away from the magnetic field detector 31 can be suppressed. In particular, scattering of the magnetic fluxes can be suppressed effectively when the magnetic fluxes in the magnetic field traveling in a direction from the magnet 21 toward the magnet 22 travel through the magnetic member 41, and then travels from the facing end surface 41C to the outside of the magnetic member 41. Therefore, when the magnet 21 and the magnet 22 move near the one end and the other end of the magnetic field detector 31, respectively, the effect of guiding the magnetic field traveling in a direction from the magnet 21 toward the magnet 22 to the magnetic field detector 31 achieved by the magnetic members 41 and 42 can be improved, so that the magnetic field detector 31 can be kept in a stable condition while the magnetic flux density is kept high.

Explained above is the magnetic field guiding function of the magnetic members 41 and 42 for the magnetic field detector 31. However, the magnetic field guiding function of the magnetic members 43 and 44 for the magnetic field detector 32 and the magnetic field guiding function of the magnetic members 45 and 46 for the magnetic field detector 33 are the same as those of the magnetic members 41 and 42 for the magnetic field detector 31. The magnetic field guiding functions of the magnetic members 41 to 46 can prevent a change that is difficult to predict in the magnetized direction of the magnetic elements 35 provided to the respective magnetic field detectors 31, 32, and 33, and improve the detection accuracy of the rotation of the shaft 213.

In the motor 211, a magnetic flux leakage occurs. Leakage magnetic fluxes basically travel radially from the axial line A. Therefore, a positional relation between the leakage magnetic fluxes and the magnetized direction of the magnetic field detectors 31, 32, and 33 becomes a twisted or an intersecting positional relation. Therefore, the operation of the magnetic field detectors 31, 32, and 33 detecting the magnetic field generated by the magnets 21, 22, 23, and 24 can be less affected by the magnetic flux leakage from the motor 211. Hence, the magnetic field detectors 31, 32, and 33 can be prevented from being caused to malfunction by the magnetic flux leakage. Furthermore, because, as a result, the magnetic field detectors 31, 32, and 33 can be positioned nearer the motor 211, the motor unit 210 including the rotation detector 1 and the motor 211 can be reduced in size.

Furthermore, when the magnetic field detectors 31, 32, and 33 are provided, a magnetic resistance (MR) element or a hall element for detecting multiple rotations no longer needs to be provided on the circuit board. Therefore, a space for implementing these elements do not need to be reserved on the board, so that the space in the circuit board can be saved and the board can be designed more freely.

Detecting Rotational Amount

Figure 16:
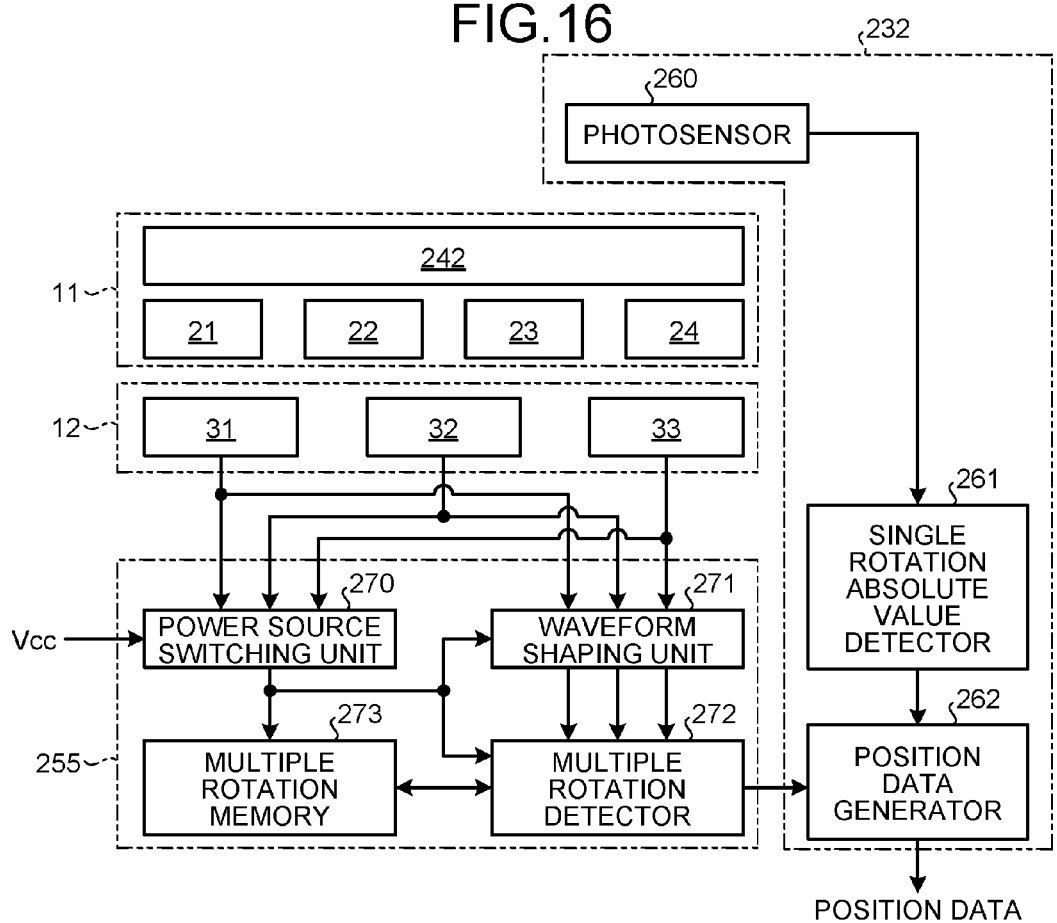
FIG. 16 is a schematic for explaining a configuration related to signal processing performed to detect a rotational amount of a motor, in the rotation detector included in the motor unit according to the embodiment.
Figure 17:
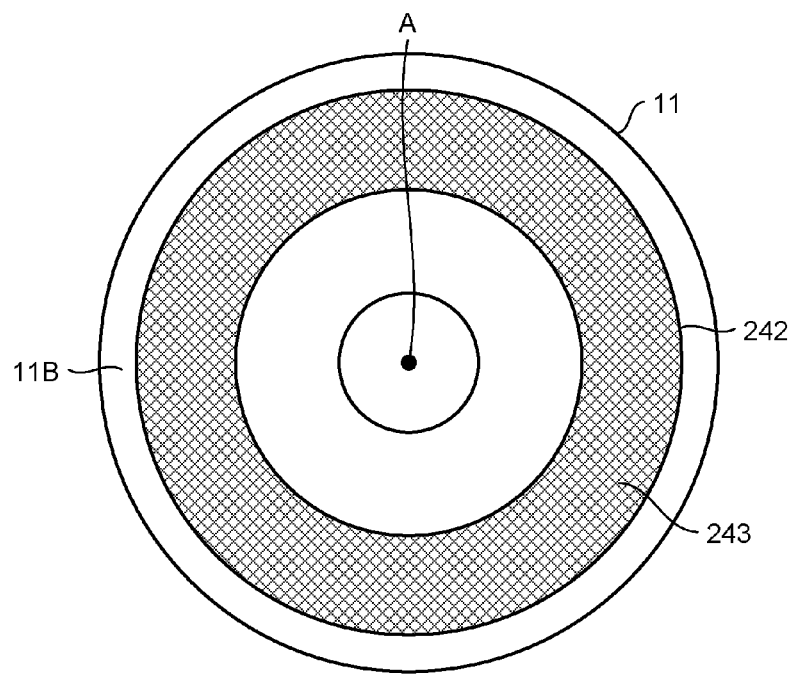
FIG. 17 is a schematic for explaining the first support and a reflective disk provided to the rotation detector included in the motor unit according to the embodiment.

FIG. 16 illustrates a configuration related to signal processing performed to detect a rotational amount x of the motor 211, in the rotation detector 1. FIG. 17 illustrates a reflective disk positioned in the first support 11.

The rotation detector 1 detects a rotation count and a rotational position (absolute position) of the shaft 213, and detects the rotational amount x of the motor 211 based on the rotation count and the rotational position of the shaft 213.

As illustrated in FIG. 16, the rotation count of the shaft 213 is detected by the magnets 21, 22, 23, and 24 provided on the surface 11A of the first support 11, the magnetic field detectors 31, 32, and 33 provided on the surface 12A of the second support 12, the magnetic members 41 to 46 covering the respective ends of the magnetic field detectors 31, 32, and 33, and a rotation count detector 255 provided to the second support 12 (see FIG. 5). Hereinafter, a unit including the magnets 21, 22, 23, and 24, the magnetic field detectors 31, 32, and 33, the magnetic members 41 to 46, and the rotation count detector 255 and detecting the rotation count of the shaft 213 is referred to as a rotation count detector 237 (see FIG. 2).

As illustrated in FIG. 16, the rotational position of the shaft 213 is detected by the reflective disk 242 provided to the first support 11 (see FIG. 3) and a photodetector 232 provided to the base portion 233 of the housing 2 (see FIG. 3). Hereinafter, a unit including the reflective disk 242 and the photodetector 232 and detecting the rotational position of the shaft 213 will be referred to as a rotational position detector 238 (an example of a rotational position detection sensor; see FIG. 2).

The rotation count detector 255 in the rotation count detector 237 and the reflective disk 242 and the photodetector 232 included in the rotational position detector 238 will now be explained.

To begin with, the rotation count detector 255 included in the rotation count detector 237 will be explained. The rotation count detector 255 is a packaged integrated circuit, for example. As illustrated in FIG. 5, the rotation count detector 255 is positioned on the surface 12A of the second support 12. The rotation count detector 255 is positioned near the center of the surface 12A so as to be positioned near and adjacent to each of the magnetic field detectors 31, 32, and 33.

The rotation count detector 255 includes a power source switching unit 270, a waveform shaping unit 271, a multiple rotation detector 272 (an example of the rotation count detector), and a multiple rotation memory 273 (an example of a memory), as illustrated in FIG. 16. The rotation count detector 255 can detect the rotation count of the shaft 213 based on the power generated from the detection pulses output from the magnetic field detectors 31, 32, and 33, even when a source voltage Vcc is not supplied from the external.

When the source voltage Vcc is supplied from the external, the power source switching unit 270 supplies the source voltage Vcc to the waveform shaping unit 271, the multiple rotation detector 272, and the multiple rotation memory 273. When the source voltage Vcc is not supplied from the external, the power source switching unit 270 supplies a voltage generated from the detection pulses output from the magnetic field detectors 31, 32, and 33 to the waveform shaping unit 271, the multiple rotation detector 272, and the multiple rotation memory 273.

The detection pulses output from the magnetic field detectors 31, 32, and 33 include detection pulses rising in the positive direction and detection pulses rising in the negative direction. Among these detection pulses, the power source switching unit 270 generates a voltage from the detection pulses rising in the positive direction, and supplies the voltage to the waveform shaping unit 271, the multiple rotation detector 272, and the multiple rotation memory 273. The detection pulse rising in the negative direction output from the magnetic field detectors 31, 32, and 33 may be used in generating a voltage when a full-wave rectifier or the like is provided.

The waveform shaping unit 271 selects a detection pulse rising in the positive direction from the detection pulses output from the magnetic field detectors 31, 32, and 33, shapes the waveform of the detection pulse thus detected into a square wave, and outputs the detection pulse having waveform shaped to the multiple rotation detector 272. The multiple rotation detector 272 detects the rotation count of the shaft 213 based on the detection pulse output from the waveform shaping unit 271.

Specifically, the multiple rotation detector 272 determines of which one of the magnetic field detectors 31, 32, and 33 the detection pulse output from the waveform shaping unit 271 corresponds, and stores the result in the multiple rotation memory 273. For example, the multiple rotation detector 272 stores data "00" when the detection pulse corresponds to the magnetic field detector 31, stores data "01" when the detection pulse corresponds to the magnetic field detector 32, and stores data "10" when the detection pulse corresponds to the magnetic field detector 33, in the multiple rotation memory 273. Based on the data stored in the multiple rotation memory 273, the multiple rotation detector 272 detects the rotation count of the shaft 213. The multiple rotation detector 272 then outputs information indicating the rotation count of the shaft 213 to a position data generator 262.

Because the rotation count detector 255 can self-generate a power to be consumed even when the source voltage Vcc is not supplied from the external, a backup power supply (e.g., battery) can be omitted.

The reflective disk 242 and the photodetector 232 included in the rotational position detector 238 will now be explained. As illustrated in FIG. 3, the reflective disk 242 is fixed to a surface 11B of the first support 11 on the opposite side of the surface 11A on which the magnets 21, 22, 23, and 24 are fixed. The reflective disk 242 rotates with the first support 11. As illustrated in FIG. 17, the reflective disk 242 has a disk shape, and has a hole at the center. The reflective disk 242 is positioned on the surface 11B so that the center of the reflective disk 242 matches the axial line A. A slit array 243 having a plurality of reflective slits is formed on the reflective disk 242 as a reflective pattern.

The photodetector 232 is fixed to a surface facing the surface 11B of the first support 11 in the base portion 233 of the housing 2, as illustrated in FIG. 3. The photodetector 232 includes a photosensor 260, a single rotation absolute value detector 261, and the position data generator 262, as illustrated in FIG. 16.

The photosensor 260 includes a light emitter and a light receiver, and the light emitter emits light to the reflective disk 242 provided to the first support 11. The photosensor 260 receives light reflected from the slit array 243 using the light receiver, and outputs a signal corresponding to the light thus received. The reflective slits in the slit array 243 are arranged along the entire circumference of the reflective disk 242 so that an absolute pattern is formed on the circumferential direction of the reflective disk 242. The absolute pattern herein is a pattern allowing a position, a ratio, or the like of each of the reflective slits within an angle facing the light receiver in the photodetector 232 to be uniquely determined within a single rotation of the reflective disk 242. The photosensor 260 receives light reflected from the reflective slits on the reflective disk 242, in response to the light emitted to the reflective disk 242, and outputs a signal corresponding to a position in the circumferential direction of the reflective disk 242.

The single rotation absolute value detector 261 detects an absolute position in the first support 11, that is, a rotational position of the shaft 213 based on the signal received from the photosensor 260, and outputs information indicating the rotational position of the shaft 213 to the position data generator 262.

The position data generator 262 acquires the information indicating the rotational position of the shaft 213 output from the single rotation absolute value detector 261, and the rotation count of the shaft 213 output from the multiple rotation detector 272 included in the rotation count detector 255. The position data generator 262 then calculates the rotational amount x of the motor 211 based on the information thus acquired. Specifically, the position data generator 262 calculates the rotational amount x of the motor 211 by adding the rotational position of the shaft 213 (rotational angle) to the rotation count of the shaft 213, for example. The position data generator 262 then outputs the position data indicating the rotational amount x thus calculated to the controller 220.

When the source voltage Vcc is supplied from the external, the position data generator 262 can calculate the rotational amount x of the motor 211 solely based on the information indicating the rotational position of the shaft 213 output from the single rotation absolute value detector 261. By contrast, when the supply of the source voltage Vcc from the external stops once and started again, the position data generator 262 calculates the rotational amount x of the motor 211 based on the information indicating the rotational position of the shaft 213 output from the single rotation absolute value detector 261 and the information indicating the rotation count of the shaft 213 output from the multiple rotation detector 272.

The multiple rotation detector 272 may output data stored in the multiple rotation memory 273 to the position data generator 262, without detecting the rotation count of the shaft 213. In such a case, the position data generator 262 calculates the rotation count of the shaft 213 based on the data stored in the multiple rotation memory 273 and the rotational position of the shaft 213.

In the rotation detector 1 having such a structure for the signal processing for detecting the rotational amount x of the motor 211, because an optical structure is used to detect the rotational position (absolute value in a single rotation), the rotational position can be detected accurately, without being affected by the magnetic flux leakage from the motor 211.

Furthermore, the rotation count detector 237 is provided on one side of the first support 11, and the rotational position detector 238 is provided on the other side, as illustrated in FIG. 2. In this manner, the first support 11 can be shared between the rotation count detection and the rotational position detection, so that the space can be saved and the size can be reduced. Furthermore, because the rotation count detector 237 and the rotational position detector 238 can be separated by the first support 11, the photodetector 232 and other circuits are less affected by the magnetic fluxes from the magnets 21, 22, 23, and 24.

Furthermore, because the multiple rotation memory 273 storing therein the detection results from the magnetic field detectors 31, 32, and 33 is positioned adjacent to the magnetic field detectors 31, 32, and 33, the power consumed in communicating the detection results from the magnetic field detectors 31, 32, and 33 to the multiple rotation memory 273 can be reduced. Furthermore, because the power source switching unit 270 is positioned adjacent to the magnetic field detectors 31, 32, and 33, the power can be supplied from the magnetic field detectors 31, 32, and 33 efficiently.

Explained for the rotation detector 1 according to the embodiment is an example in which the side plate portions 41B to 46B are provided to the respective magnetic members 41 to 46. However, it is also possible to adopt a configuration including magnetic members 51 and 52 not provided with a side plate portion, as in a rotation detector 1A illustrated in FIG. 18. Of course, the advantageous effects achieved by the magnetic members become different between when each of the magnetic members has the side plate portion and when not. The difference in such advantageous effects will now be explained with reference to FIGS. 9, 13, 18, and 19. FIG. 19 illustrates a relation between a longitudinal position in the magnetic element 35 in the magnetic field detector 31 and a magnetic flux density in the magnetic element 35, when the rotational angle of the first support 11 is 0 degrees and 90 degrees in the rotation detector 1A illustrated in FIG. 18.

The magnetic members 41 and 42 have the side plate portion 41B and the side plate portion 42B, respectively, and one end surface (left end surface) and the other end surface (right end surface) of the magnetic field detector 31 are covered by the side plate portions 41B and 42B, respectively, as illustrated in FIG. 9. In this configuration, when the magnet 21 and the magnet 22 move near the one end and the other end of the magnetic field detector 31, respectively, the magnetic field enters the end surface of the one end of the magnetic field detector 31 via the side plate portion 41B, and goes out from the end surface of the other end of the magnetic field detector 31 toward the side plate portion 42B, as indicated by the arrows in the black dashed line in FIG. 9. Therefore, when the magnet 21 and the magnet 22 move near the one end and the other end of the magnetic field detector 31, respectively, not only the magnetic flux density in the mid-portion but also those in the one end and in the other end of the magnetic element 35 are increased, compared with when the magnet 21 and the magnet 22 are not near the one end and the other end of the magnetic field detector 31, as illustrated in FIG. 13.

Figure 18:
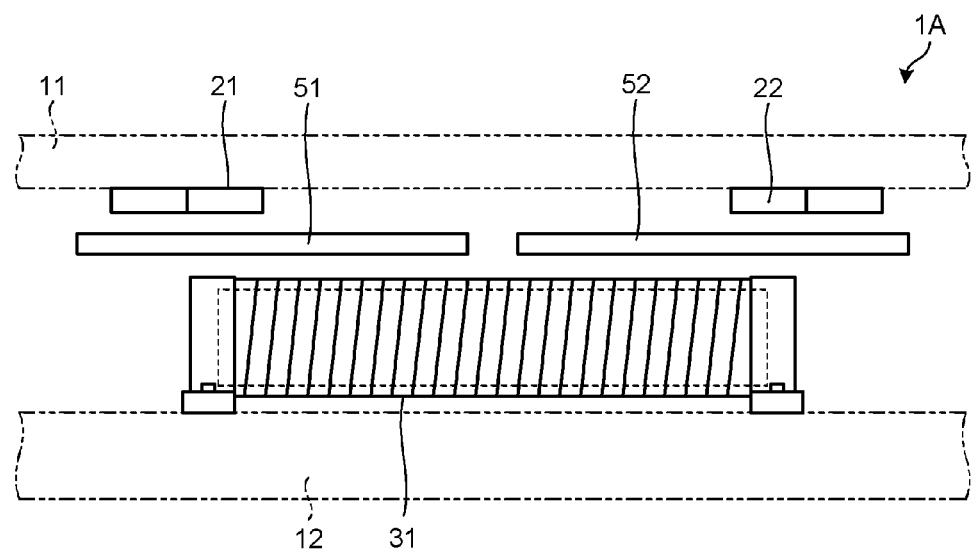
FIG. 18 is a schematic for explaining a variation in which a side plate portion of the magnetic member is removed, in the rotation detector included in the motor unit according to the embodiment.
Figure 19:
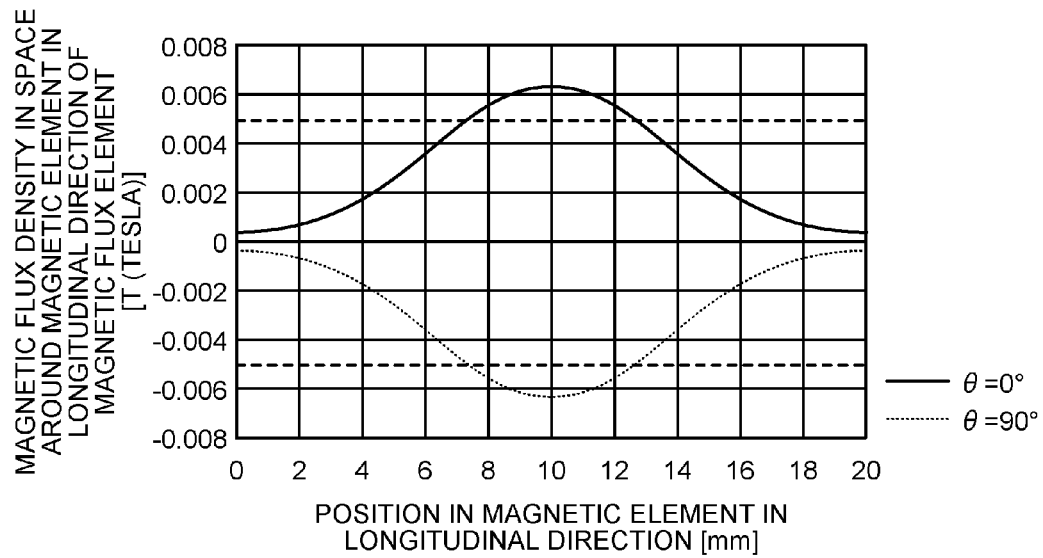
FIG. 19 is a graph of characterization lines indicating a relation between a longitudinal position in one of the magnetic elements and a magnetic flux density in the magnetic element in the rotation detector illustrated in FIG. 18.

By contrast, the magnetic members 51 and 52 do not have the side plate portion, and the end surface of the one end (left end surface) and the end surface of the other end (right end surface) of the magnetic field detector 31 are not covered by the side plate portions, as illustrated in FIG. 18. Therefore, when the magnet 21 and the magnet 22 move near the one end and the other end of the magnetic field detector 31, respectively, the magnetic field entering from the end surface of the one end of the magnetic field detector 31 or the magnetic field going out from the end surface of the other end of the magnetic field detector 31 are not formed as much. As a result, when the magnet 21 and the magnet 22 move near the one end and the other end of the magnetic field detector 31, respectively, the magnetic flux densities in the one end and the other end of the magnetic element 35 are not increased, and remain at the same level as those when the magnet 21 and the magnet 22 are not near the one end and the other end of the magnetic field detector 31, respectively, as illustrated in FIG. 19.

In order to induce a reversal of the magnetized direction of the magnetic element 35 reliably and to acquire a stable detection pulse at a high output level, it is desirable for the magnetic flux density in the entire magnetic element 35 to be increased when the magnet 21 and the magnet 22 move near the one end and the other end of the magnetic field detector 31, respectively. From this viewpoint, it is preferable to provide a side plate portion to each of the magnetic members.

Figure 20:
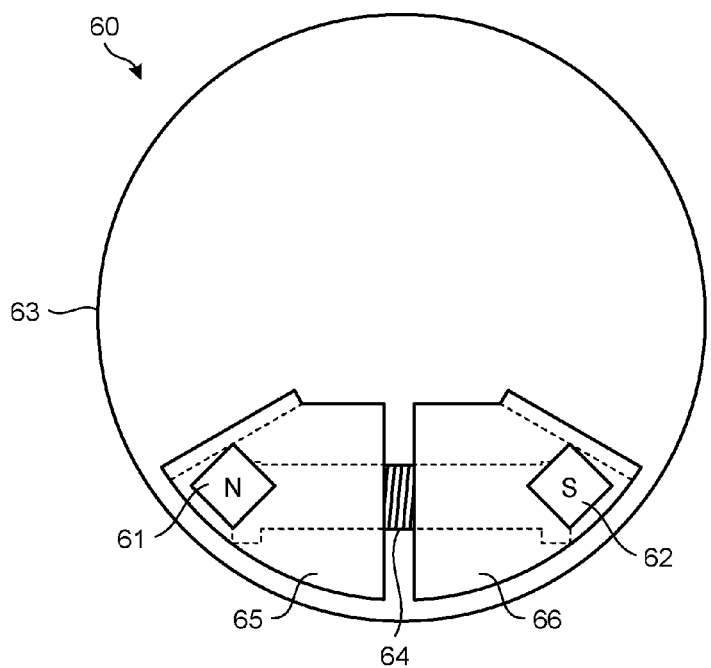
FIG. 20 is a schematic for explaining a rotation detector according to another embodiment.

Furthermore, in the rotation detector 1 according to the embodiment, the first support 11 is provided with four magnets 21, 22, 23, and 24 arranged at an interval of 90 degrees, and the second support 12 is provided with three magnetic field detectors arranged at an interval of 120 degrees. However, the present invention is not limited thereto. The number of the magnets may be any number more than two. The interval at which the magnets are arranged, the number of the magnetic field detectors, and the interval at which the magnetic field detectors are arranged are not also limited. Of course, it is desirable to set the intervals at which the magnets are arranged and the magnetic field detectors are arranged in such a manner that the detection pulses from any of the magnetic field detectors is not output at the same timing as the first support is rotated, as mentioned earlier. FIG. 20 illustrates a rotation detector 60, as a rotation detector according to another embodiment, in which the first support is provided with two magnets 61 and 62, the second support 63 is provided with one magnetic field detector 64, and one end and the other end of the magnetic field detector 64 are covered by magnetic members 65 and 66, respectively.

The shape of the magnets provided on the first support 11 is not limited to the shape described in this embodiment. Furthermore, the magnets may be electromagnets.

Furthermore, explained in the rotation detector 1 according to the embodiment is an example in which a compound magnetic wire is used as the magnetic element 35 in each of the magnetic field detectors 31, 32, and 33, but another Barkhausen element may also be used.

Furthermore, in the rotation detector 1 according to the embodiment, iron is explained as an example of the magnetic material for forming the magnetic members 41 to 46 or the like, but the present invention is not limited thereto, and other magnetic or ferromagnetic materials such as permalloy or a magnetic steel sheet may also be used.

Figure 21:
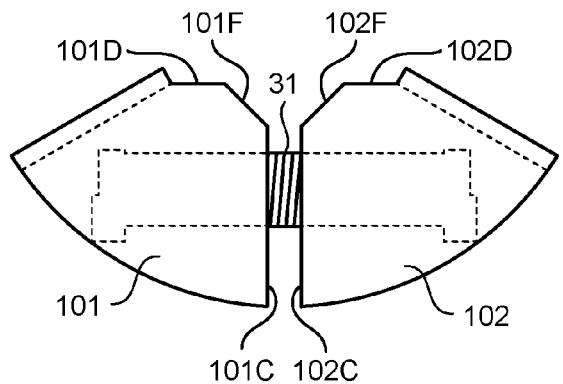
FIG. 21 is a schematic for explaining a variation of the magnetic members provided to the rotation detector in the motor unit according to the embodiment.
Figure 22:
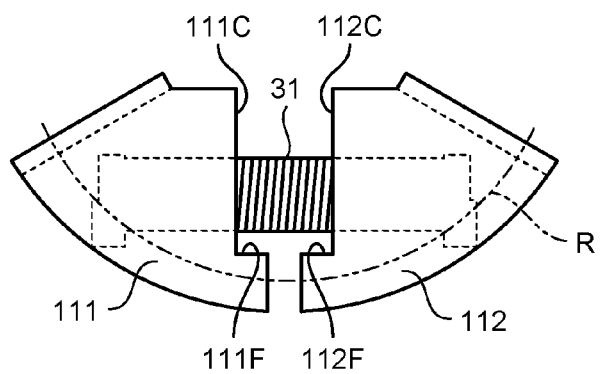
FIG. 22 is a schematic for explaining another variation of the magnetic members provided to the rotation detector in the motor unit according to the embodiment.
Figure 23:
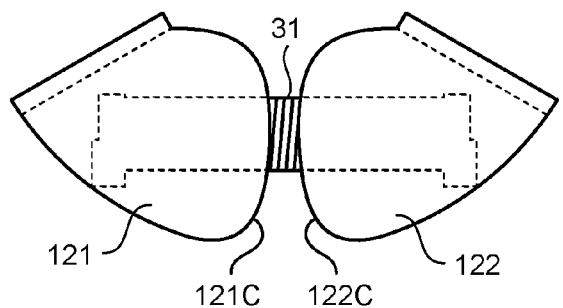
FIGS. 23 and 24 are schematics for explaining another variation of the magnetic members provided to the rotation detector in the motor unit according to the embodiment.
Figure 24:
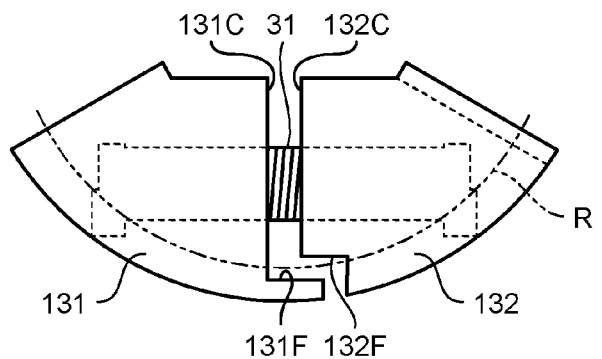

Furthermore, various modifications of the shape of each of the magnetic members 41 to 46 are possible. For example, as in magnetic members 101, 102 illustrated in FIG. 21, a part of the corner at which a facing end surface 101C (102C) meets an inner circumference side end surface 101D (102D) may be removed, and a slanted surface 101F (102F) may be provided between the facing end surface 101C (102C) and the inner circumference side end surface 101D (102D). Furthermore, as in magnetic members 111, 112 illustrated in FIG. 22, stepped portions 111F, 112F may be formed on respective facing end surfaces 111C, 112C, and the distance between the facing end surface 111C and the facing end surface 112C may be partially changed. Specifically, the distance between the facing end surface 111C and the facing end surface 112C is increased in the parts corresponding to the mid-portion of the magnetic field detector 31. The distance between the facing end surface 111C and the facing end surface 112C is reduced in the parts corresponding to the area where the magnets 21, 22, 23, and 24 pass (part corresponding to the circumference R). Furthermore, as in magnetic member 121, 122 illustrated in FIG. 23, each of a facing end surface 121C and a facing end surface 122C may be provided with an arc-shape so that the facing end surface 121C and the facing end surface 122C come nearest each other in the parts corresponding to the mid-portion of the magnetic field detector 31. Furthermore, as in magnetic members 131, 132 illustrated in FIG. 24, crank portions 131F, 132F bent in a crank shape may be formed on the parts of a facing end surface 131C and a facing end surface 132C corresponding to the area where the magnets 21, 22, 23, and 24 pass (part corresponding to the circumference R).

Furthermore, explained in the embodiment described above is an example in which the first support 11 and the magnets 21, 22, 23, and 24 provided on the first support 11 are rotated. Alternatively, the second support 12 and the magnetic field detectors 31, 32, and 33 provided on the second support 12 may be rotated.

As described above, the motor unit according to the embodiment includes a motor that causes a shaft to be rotated about an axial line and a rotation detector that detects the rotation of the shaft. In the rotation detector, for example, the first support is provided with an N-pole first magnetic field generator and an S-pole second magnetic field generator positioned around the axial line in a manner separated from each other in the circumferential direction. In this manner, a magnetic field in a direction from the first magnetic field generator toward the second magnetic field generator is formed in a space between first support and the second support. When one of the first support and the second support is rotated, the magnetic field detectors are relatively moved in the circumferential direction through the space where the magnetic field is formed.

When the first magnetic field generator and one longitudinal-direction end of the magnetic field detector move near each other and the second magnetic field generator and the other longitudinal-direction end of the magnetic field detector move near each other as one of the first support and the second support is rotated, the magnetic element in the magnetic field detector is magnetized in a direction from the one end toward the other end of the magnetic element, by the magnetic field in a direction from the first magnetic field generator toward the second magnetic field generator. Furthermore, when the first magnetic field generator and the other longitudinal-direction end of the magnetic field detector move near each other and the second magnetic field generator and the one longitudinal-direction end of the magnetic field detector move near each other as one of the first support and the second support is rotated, the magnetic element in the magnetic field detector is magnetized in the direction from the other end toward the one end of the magnetic element, by the magnetic field in a direction from the first magnetic field generator toward the second magnetic field generator. Because the magnetized direction of the magnetic element is changed as one of the first support and the second support is rotated in the manner described above, the rotational conditions of the first support or the second support can be detected based on the change in the magnetized direction of the magnetic element.

The one longitudinal-direction end of the magnetic field detector is covered by a first magnetic member, and the longitudinal-direction other end is covered by a second magnetic member. Furthermore, the first magnetic member and the second magnetic member are near each other in the longitudinal-direction mid-portion of the magnetic field detector, but are not in contact with each other. The first magnetic member and the second magnetic member guide the magnetic field traveling in the direction from the first magnetic field generator toward the second magnetic field generator in the manner described below.

When the first magnetic field generator and the one end of the magnetic field detector move near each other and the second magnetic field generator and the other end of the magnetic field detector move near each other as one of the first support and the second support is rotated, the first magnetic member comes between the first magnetic field generator and the one end of the magnetic field detector, and the second magnetic member comes between the second magnetic field generator and the other end of the magnetic field detector. Therefore, a large portion of the magnetic fluxes generated by the first magnetic field generator and the second magnetic field generator enters the first magnetic member, not the one end of the magnetic field detector, from the first magnetic field generator. The magnetic fluxes entering the first magnetic member travel through the first magnetic member toward the second magnetic member. Because the first magnetic member and the second magnetic member are separated from each other in the longitudinal-direction mid-portion of the magnetic field detector, the magnetic fluxes traveling through the first magnetic member approach the second magnetic member, but does not enter the second magnetic member directly, but enters a portion of the mid-portion slightly near the one end of the magnetic field detector. The magnetic fluxes entering the portion of the mid-portion slightly near the one end of the magnetic field detector travel through the magnetic field detector toward the other end of the magnetic field detector, passes through the longitudinal-direction mid-portion of the magnetic field detector, and reaches a part of the mid-portion slightly near the other end of the magnetic field detector. The magnetic fluxes reaching the part of the mid-portion slightly near the other end of the magnetic field detector separate from the magnetic field detector, and enters the second magnetic member. The magnetic fluxes entering the second magnetic member travels through the second magnetic member toward the second magnetic field generator, and reaches the second magnetic field generator via the second magnetic member.

When the first magnetic field generator and the other end of the magnetic field detector move near each other and the second magnetic field generator and the one end of the magnetic field detector move near each other as one of the first support and the second support is rotated, the magnetic field traveling in the direction from the first magnetic field generator toward the second magnetic field generator follows the same path as the magnetic field described above, but in the opposite direction. In other words, a large portion of the magnetic fluxes generated by the first magnetic field generator and the second magnetic field generator travels from the first magnetic field generator, through the second magnetic member, the mid-portion of the magnetic field detector, and the first magnetic member, and reaches the second magnetic field generator.

Because the magnetic field is guided by the first magnetic member and the second magnetic member in the manner described above, a large portion of the magnetic fluxes traveling from the first magnetic field generator toward the second magnetic field generator passes through the mid-portion of the magnetic field detector. As a result, the magnetic flux density in the mid-portion of the magnetic field detector is increased when the first magnetic field generator and the one end (or the other end) of the magnetic field detector move near each other and the second magnetic field generator and the other end (or the one end) of the magnetic field detector move near each other. The magnetic flux density in the mid-portion of the magnetic field detector is reduced when the first magnetic field generator and the second magnetic field generator separate from the one end and the other end of the magnetic field detector, respectively. By contrast, a change in the magnetic flux densities in the one end and the other end of the magnetic field detector is extremely small compared with a change in the magnetic flux density in the mid-portion of the magnetic field detector, regardless of whether the first magnetic field generator and the second magnetic field generator are near or away from the respective ends of the magnetic field detector. Therefore, the magnetized direction of the magnetic element can be changed only when the first magnetic field generator and the one end (or the other end) of the magnetic field detector are near each other and the second magnetic field generator and the other end (or the one end) of the magnetic field detector are near each other, and the magnetized direction of the magnetic element can be prevented from changing in any cases other than that.

Therefore, it is possible to prevent a change that is difficult to predict in the magnetized direction of the magnetic elements included in the magnetic field detector, and to improve the accuracy at which the rotation of the shaft is detected. Furthermore, because it is possible to reduce the size of the rotation detector in a direction along the rotational axis, the size of the motor unit itself can be reduced.

Furthermore, the first magnetic member extends toward the inner circumference side and the outer circumference side of the second support from the position corresponding to the one end longitudinal-direction of the magnetic field detector, and covers a larger area toward the inner circumference side and the outer circumference side of the second support than the one longitudinal-direction end of the magnetic field detector. The second magnetic member extends toward the inner circumference side and the outer circumference side of the second support from the position corresponding to the other longitudinal-direction end of magnetic field detector, and covers a larger area toward the inner circumference side and the outer circumference side of the second support than the other longitudinal-direction end of the magnetic field detector.

Because the first magnetic member covers a large area including the one end of the magnetic field detector, and the second magnetic member covers a large area including the other end of the magnetic field detector, when the first magnetic field generator and the second magnetic field generator are near the respective ends of the magnetic field detector, such a configuration can improve the effect of guiding the magnetic field generated by the magnetic field generator to the mid-portion of the magnetic field detector. When the first magnetic field generator and the second magnetic field generator are not near the respective ends of the magnetic field detector, such a configuration can prevent the magnetic field generated by the magnetic field generator from entering the magnetic field detector. In this manner, it is possible to prevent a change that is difficult to predict in the magnetized direction of the magnetic element included in the magnetic field detector.

Furthermore, the end surface of the first magnetic member and the end surface of the second magnetic member facing each other at the position corresponding to the longitudinal-direction mid-portion of the magnetic field detector extend in a direction perpendicular to the axial line and perpendicular to the longitudinal direction of the magnetic field detector.

Therefore, when the first magnetic field generator and the second magnetic field generator move near the one end and the other end of the magnetic field detector, respectively, as one of the first support and the second support is rotated, such a structure can suppress scattering of the magnetic field traveling in the direction from the first magnetic field generator toward the second magnetic field generator, and allows the magnetic field to travel in a direction parallel with the longitudinal direction of the magnetic field detector. In particular, such a structure can suppress scattering of the magnetic field when the magnetic field travels toward the outside of the first magnetic member from the end surface of the first magnetic member facing the end surface of the second magnetic member at the position corresponding to the longitudinal-direction mid-portion of the magnetic field detector, or when the magnetic field travels toward the outside of the second magnetic member from the end surface of the second magnetic member facing the end surface of the first magnetic member at the position corresponding to the longitudinal-direction mid-portion of the magnetic field detector. In this manner, the mid-portion of the magnetic field detector can be kept in a stable condition with a high magnetic flux density. Therefore, such a configuration can increase and stabilize the changes in the magnetic flux density that occur when magnetic field generator and the respective end of the magnetic field detector move near each other or separate from each other, in the mid-portion of the magnetic field detector.

Furthermore, the end surface of the first magnetic member facing the axial line extends in a direction parallel with the longitudinal direction of the magnetic field detector, and the end surface of the second magnetic member facing the axial line extends in a direction parallel with the longitudinal direction of the magnetic field detector.

Therefore, when the first magnetic field generator and the second magnetic field generator move near the one end and the other end of the magnetic field detector, respectively, as one of the first support and the second support is rotated, such a configuration can suppress scattering of the magnetic field traveling in the direction from the first magnetic field generator toward the second magnetic field generator, and allows the magnetic field to travel in a direction parallel with the longitudinal direction of the magnetic field detector. In particular, such a configuration can suppress scattering of the magnetic field toward the outside of the first magnetic member or the second magnetic member from the end surfaces facing the axial line. In this manner, the mid-portion of the magnetic field detector can be kept in a stable condition with a high magnetic flux density. Therefore, such a configuration can increase and stabilize the changes in the magnetic flux density that occur when the magnetic field generator and the respective end of the magnetic field detector move near each other or separate from each other, in the mid-portion of the magnetic field detector.

Furthermore, the first magnetic member covers the end surface of the one longitudinal-direction end of the magnetic field detector, and the second magnetic member covers the end surface of the other longitudinal-direction end of the magnetic field detector.

Therefore, when the first magnetic field generator and the second magnetic field generator move near the respective ends of the magnetic field detector, such a configuration can guide the magnetic field generated by the pair of these magnetic field generator to the one end and the other end of the magnetic field detector, as well as to the mid-portion of the magnetic field detector. In this manner, the magnetic flux density of the both ends, as well as the mid-portion, of the magnetic field detector can be increased, and the magnetized direction in the entire magnetic field detector can be aligned to the direction of the magnetic field generated by the pair of these magnetic field generator. Therefore, the output level of the electric signal (detection signal) output from the coil can increased, and a change in the magnetized direction of the magnetic element included in the magnetic field detector can be detected highly accurately. At the same time, when the first magnetic field generator or the second magnetic field generator is not near the ends of the magnetic field detector, such a configuration can prevent the magnetic field generated by the magnetic field generator from entering the magnetic field detector. Therefore, a change that is difficult to predict in the magnetized direction of the magnetic element included in the magnetic field detector can be prevented.

Furthermore, each of the magnetic field generator is a permanent magnet, and the size of each of the magnetic field generator in the circumferential direction or in a direction tangential to the circumference is larger than the distance between the end surface of the first magnetic member and the end surface of the second magnetic member facing each other at the position corresponding to the longitudinal-direction mid-portion of the magnetic field detector.

Therefore, when the first magnetic field generator or the second magnetic field generator moves near the mid-portion of the magnetic field detector as one of the first support and the second support is rotated, such a configuration can suppress entry of the magnetic field generated by the magnetic field generator into the magnetic field detector. In other words, because the size of each of the magnetic field generator in the circumferential direction or in the direction tangential to the circumference is larger than the distance between the end surface of the first magnetic member and the end surface of the second magnetic member facing each other at the position corresponding to the longitudinal-direction mid-portion of the magnetic field detector, when the first magnetic field generator moves near the mid-portion of the magnetic field detector, for example, the distance between the first magnetic field generator and the first magnetic member or the second magnetic member becomes shorter than the distance between the first magnetic field generator and the mid-portion of the magnetic field detector. Therefore, a large portion of the magnetic field traveling in the direction from the first magnetic field generator toward the second magnetic field generator enters the first magnetic member or the second magnetic member. As a result, almost none of the magnetic field enters the magnetic field detector. Similarly, when the second magnetic field generator moves near the mid-portion of the magnetic field detector, a large portion of the magnetic field traveling in the direction from the first magnetic field generator toward the second magnetic field generator enters the first magnetic member or the second magnetic member. As a result, almost none of the magnetic field enters the magnetic field detector. Therefore, such a configuration can prevent a change in the magnetized direction of the magnetic element included in the magnetic field detector when the first magnetic field generator or the second magnetic field generator moves near the mid-portion of the magnetic field detector.

Furthermore, because the magnetic element is a large Barkhausen element, for example, when a magnetic field is applied to the magnetic element via the first magnetic field detector and the second magnetic field detector, the magnetized direction of the magnetic element is suddenly reversed, and the electromotive force caused by such a reversal results in a sharply rising pulse-like electric signal flowing into the coil. Therefore, a pulse signal corresponding to the change in the magnetized direction of the magnetic element can be acquired as a detection signal, so that the rotational conditions of the first support or the second support can be detected highly accurately or easily.

Furthermore, the second support is provided with at least three of the magnetic field detectors in a manner surrounding the entire circumference of the axial line, and each of the magnetic field detectors is provided with the first magnetic member and the second magnetic member. Among a plurality of the first magnetic members and a plurality of the second magnetic members, each pair of the first magnetic member and the second magnetic member adjacent to each other in the circumferential direction are positioned near each other, and a sequential arrangement of these pairs of the first magnetic member and the second magnetic member covers almost the entire circumference of the outer circumferential side of the second support facing the first support, while each of the magnetic field detectors are interposed between these pairs and the second support.

In the manner described above, by covering almost the entire circumference of the outer circumferential side of the second support facing the first support by the sequential arrangements of the first magnetic members and the second magnetic members, generation of a magnetic force between the magnetic field generator and the magnetic field detector can be suppressed, or the magnetic force can be evened out across the circumferential direction. In this manner, generation of cogging when the first support or the second support is rotated can be suppressed.

Furthermore, the rotation detector includes a memory storing therein detection results from the magnetic field detectors, and the rotation count detector detecting the rotation count of the shaft based on the information stored in the memory. The memory is positioned adjacent to the magnetic field detectors.

Because the memory is positioned adjacent to the magnetic field detectors, when the detection results from the magnetic field detectors are to be stored in memory, the power consumed in communicating the detection results from the magnetic field detectors to the memory can be reduced.

Furthermore, the rotation detector includes an optical rotational position detection sensor that detects the rotational position of the shaft. The rotational position detection sensor includes a reflective pattern formed on the first support or the second support rotating with the shaft, and a photosensor that outputs light to the reflective pattern and receives a light reflected from the reflective pattern.

By adopting such a configuration using an optical rotational position detection sensor to detect the rotational position of the shaft, the rotational position of the shaft can be detected highly accurately without being affected by the leakage magnetic flux from the motor.

Furthermore, the reflective pattern is formed on a surface of the first support on the opposite side of the surface on which the magnetic field generator are provided, or on a surface of the second support on the opposite side of the surface on which magnetic field detectors are provided.

When the reflective pattern is formed on the first support, because both of the magnetic field generator and the reflective pattern can be provided to the first support, the first support can be shared as a common member between the magnetic field generator and the reflective pattern. When the reflective pattern is formed on the second support, because both of the magnetic field detectors and the reflective pattern can be provided to the second support, the second support can be shared as a common member between the magnetic field detectors and the reflective pattern. In this manner, the size of the rotation detector can be reduced, so that the size of the motor can be reduced.

Furthermore, when the reflective pattern is formed on the first support, the magnetic field generator and the rotational position detection sensor can be separated by the first support. Furthermore, when the reflective pattern is formed on the second support, the magnetic field detectors and the rotational position detection sensor can be separated by the second support. By separating the rotational position detection sensor and the magnetic field generator or the magnetic field detectors in the manner described above, the rotational position detection sensor can be configured to be less affected by the magnetic field generated by the magnetic field detectors.

Furthermore, the first support is positioned nearer to the motor than the second support is, and is rotated as the shaft is rotated. The reflective pattern is formed on a surface of the first support facing the motor.

When the first support is positioned nearer to the motor unit than the second support is and the reflective pattern is formed on a surface of the first support facing the motor, the motor, the rotational position detection sensor, the first support, the magnetic field generator, the magnetic field detectors, and the second support are arranged in the order described herein. Because such an arrangement enables the rotational position detection sensor to be interposed between the motor and a magnetic structure including the magnetic field generator and the magnetic field detectors, the motor and the magnetic structure are positioned separated from each other. Therefore, the magnetic structure can be configured to be less affected by the leakage magnetic fluxes from the motor unit.

Furthermore, the present invention can be modified as appropriate within the scope not deviating from the essence or the spirit of the present invention understood from the claims and the entire specification, and a motor thus modified is included in the technical ideas according to the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor unit comprising:
   a motor configured to cause a shaft to be rotated about an axial line; and
   a rotation detector configured to detect a rotation of the shaft, wherein
   the rotation detector includes:
      a first support and a second support. that are provided in a manner separated from each other in a direction along the axial line, and one of which is rotated about the axial line as a rotational axis as the shaft is rotated:
      a pair of magnetic field generator that is provided on the first support in a manner facing the second support at positions different from each other along a circumference around the axial line, and that has opposite polarities;
      at least one magnetic field detector that is formed by winding a coil around a magnetic element whose magnetized direction changes in a longitudinal direction, and is provided on the second support in such a manner that a longitudinal-direction side of the magnetic element faces the first support; and
      a first magnetic member and a second magnetic member that are made of a magnetic material, cover longitudinal-direction both ends of the magnetic field detector facing the first support, respectively, and face each other with a space therebetween at a longitudinal-direction mid-portion of the magnetic field detector.

2. The motor unit according to claim 1, wherein
   the first magnetic member extends toward the axial line and toward an opposite side of the axial line from a position corresponding to the one end, and
   the second magnetic member extends toward the axial line and toward the opposite side of the axial line from a position corresponding to the other end.

3. The motor unit according to claim 1, wherein an end surface of the first magnetic member and an end surface of the second magnetic member facing each other at a position corresponding to the mid-portion extend in a direction perpendicular to the axial line and perpendicular to the longitudinal direction of the magnetic field detector.

4. The motor unit according to claim 1, Wherein an end surface of the first magnetic member facing the axial line extends in a direction parallel with the longitudinal direction of the magnetic field detector, and an end surface of the second magnetic member facing the axial line extends in the direction parallel with the longitudinal direction of the magnetic field detector.

5. The motor unit according to claim 1, wherein the first magnetic member covers an end surface of the one end, and the second magnetic member covers an end surface of the other end.

6. The motor unit according to claim 1, wherein each of the magnetic field generator is a permanent magnet, and, among, sizes of each of the magnetic field generator, a size in a circumferential direction of the circumference is larger than a distance between an end surface of the first magnetic member and an end surface of the second magnetic member facing each other at a position corresponding to the mid-portion.

7. The motor unit according to claim 1, wherein the magnetic element is a large Barkhausen element.

8. The motor unit according, to claim 1, wherein
at least three of the magnetic field detectors are provided on the second support, in a manner surroundine an entire circumference of the axial line, at positions different from each other along the circumference, and
each of the magnetic field detectors is provided with the first magnetic member and the second magnetic member.

9. The motor unit according to claim 1, further comprising:
a memory configured to store therein a detection result from the magnetic field detector; and
a rotation count detector configured to detect a rotation count of the shaft based on information stored in the memory, wherein
the memory is positioned adjacent to the magnetic field detector.

10. The motor unit according to claim 1, further comprising:
an optical rotational position detection sensor configured to detect a rotational position of the shaft, wherein
the rotational position detection sensor includes:
    a reflective pattern that is formed on the first support or the second support rotating with the shaft; and
    a photosensor configured to output light to the reflective pattern and receive light reflected from the reflective pattern.

11. The motor unit according to claim 10, wherein the reflective pattern is formed on a surface of the first support at an opposite side of a surface on which the magnetic field generator are provided, or on a surface of the second support at an opposite side of a surface on which the magnetic field detector is provided.

12. The motor unit according to claim 10, wherein
the first support is positioned nearer to the motor than the second support is, and is rotated as the shaft is rotated, and
the reflective pattern is formed on a surface facing the motor in the first support.

13. The motor according to claim 11, wherein
the first support is positioned nearer to the motor than the second support is, and is rotated as the shaft is rotated, and
the reflective pattern is formed on a surface facing the motor in the first support.

14. A motor unit comprising:
a motor to rotate a shaft about an axial line; and
a rotation detector to detect a rotation of the shaft, the rotation detector comprising:
    means for generating a magnetic field;
    means for detecting the magnetic field through a reversal of a magnetized direction in a magnetic element whose magnetized direction changes in a longitudinal direction of the magnetic element:
    means for forming a magnetic path by guiding the magnetic field, the means for forming the magnetic path being positioned between the magnetic element and the means for generating the magnetic field; and
    means for rotating the means for generating the magnetic field relative to a supporter about the axial line, the means for detecting a magnetic field, and the means for forming the magnetic path being mounted on the supporter.

* * * * *